(12) United States Patent
Seo et al.

(10) Patent No.: US 11,275,458 B2
(45) Date of Patent: Mar. 15, 2022

(54) METHOD, ELECTRONIC DEVICE, AND STORAGE MEDIUM FOR FINGERPRINT RECOGNITION

(71) Applicant: Samsung Electronics Co., Ltd., Gyeonggi-do (KR)

(72) Inventors: Kem-Suk Seo, Gyeonggi-do (KR); Bong-Jae Rhee, Gyeonggi-do (KR); Sun-A Kim, Gyeonggi-do (KR); Jeong-Hoo Kim, Suwon-si (KR); Chi-Hyun Cho, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/642,104

(22) PCT Filed: Aug. 29, 2018

(86) PCT No.: PCT/KR2018/009995
§ 371 (c)(1),
(2) Date: Feb. 26, 2020

(87) PCT Pub. No.: WO2019/050212
PCT Pub. Date: Mar. 14, 2019

(65) Prior Publication Data
US 2020/0210004 A1      Jul. 2, 2020

(30) Foreign Application Priority Data

Sep. 7, 2017 (KR) .................. 10-2017-0114645
Jun. 11, 2018 (KR) .................. 10-2018-0066616

(51) Int. Cl.
*G06F 3/041* (2006.01)
*G06F 21/32* (2013.01)
*G06K 9/00* (2022.01)

(52) U.S. Cl.
CPC ........ *G06F 3/0412* (2013.01); *G06F 3/04166* (2019.05); *G06F 3/04184* (2019.05);
(Continued)

(58) Field of Classification Search
None
See application file for complete search history.

(56) References Cited

U.S. PATENT DOCUMENTS 9,727,156 B2    8/2017  Kim et al.
2012/0086549 A1*  4/2012  Barnes, Jr. ......... G06Q 30/0639
                                                    340/5.61
(Continued)

FOREIGN PATENT DOCUMENTS

KR  10-2013-0057637 A   6/2013
KR  10-2015-0073539 A   7/2015
(Continued)

*Primary Examiner* — Kirk W Hermann
(74) *Attorney, Agent, or Firm* — Cha & Reiter, LLC

(57) ABSTRACT

There is provided a device that includes: a display; at least one sensor disposed to be adjacent to the display; a biometric sensor disposed in at least a partial region of the display; and at least one processor, wherein the at least one processor can be set up to receive an input in the at least a partial region from an external object, by using the at least one sensor or the biometric sensor, and to obtain biometrics of the external object by using the biometric sensor on the basis, at least partially, of the input by the external object.

12 Claims, 21 Drawing Sheets

(52) U.S. Cl.
CPC ........... *G06F 21/32* (2013.01); *G06K 9/0002* (2013.01); *G06K 9/00067* (2013.01); *G06K 9/00912* (2013.01)

(56) References Cited

U.S. PATENT DOCUMENTS

| | | |
|---|---|---|
| 2013/0135247 A1 | 5/2013 | Na et al. |
| 2014/0062899 A1* | 3/2014 | Lee ................... G06F 3/0446 345/173 |
| 2015/0135108 A1 | 5/2015 | Pope et al. |
| 2015/0177884 A1* | 6/2015 | Han ................... G06F 3/04166 345/174 |
| 2016/0171281 A1* | 6/2016 | Park .................... G06F 21/32 382/124 |
| 2016/0283022 A1 | 9/2016 | Yang et al. |
| 2016/0321494 A1 | 11/2016 | Shin et al. |
| 2017/0103246 A1 | 4/2017 | Pi et al. |
| 2017/0220842 A1* | 8/2017 | Thompson ......... G06K 9/00912 |

FOREIGN PATENT DOCUMENTS

| | | |
|---|---|---|
| KR | 10-2016-0071887 A | 6/2016 |
| KR | 10-2016-0125872 A | 11/2016 |
| KR | 10-2016-0128872 A | 11/2016 |
| KR | 10-2016-0135318 A | 11/2016 |
| WO | 2016/036304 A1 | 3/2016 |

* cited by examiner

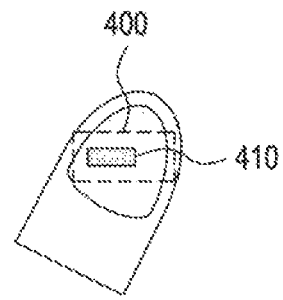
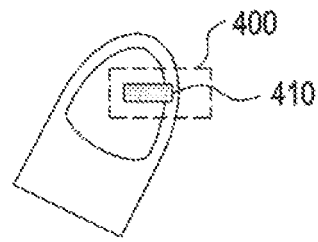
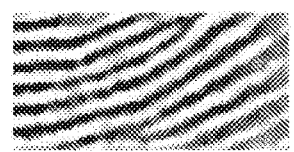
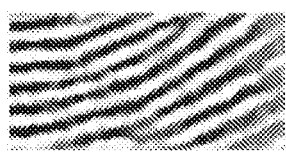
FIG.4A    FIG.4B
| | 501a | | 503a | | 501b | | 503b | |
|---|---|---|---|---|---|---|---|---|
| | Lotion 5° Wet | | Washed 5° Dry | | Lotion 25° Wet | | Washed 25° Dry | |
| Force | 10 | 150 | 10 | 150 | 10 | 150 | 10 | 150 |
| Image |  | 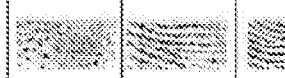 | 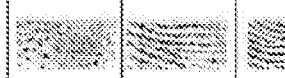 |  |  |  |  |  |
| Score | 25.05 | 25.05 | 21.36 | (25.02) | 25.05 | 25.05 | 21.36 | (25.02) |
FIG.5

METHOD, ELECTRONIC DEVICE, AND STORAGE MEDIUM FOR FINGERPRINT RECOGNITION

CROSS-REFERENCE TO RELATED APPLICATION(S)

This application is a National Phase Entry of PCT international Application No. PCT/KR2018/009995, which was filed on Aug. 29, 2018, and claims priority to Korean Patent Application No. 10-2017-0114645 filed on Sep. 7, 2017, and No. 10-2018-0066616 filed on Jun. 11, 2018, in Korean Intellectual Property Office, the contents of which are incorporated herein by reference.

BACKGROUND

1. Field

The disclosure generally relates to an electronic device and a fingerprint recognition method of the electronic device.

2. Description of the Related Art

Various services and additional functions provided through portable electronic devices such as smart phones are gradually expanding. In order to increase the utility value of these electronic devices and satisfy the needs of various users, communication service providers or electronic device manufacturers provide various functions.

Various functions provided in the electronic device include various biometric technologies, and as the performance of the electronic device has been advanced, various biometric technologies have been applied to the portable electronic devices. Fingerprint recognition technology is most commonly used among various biometric technologies. User authentication through fingerprint recognition has the advantage of excellent security and being a simple authentication method.

SUMMARY

In an optical fingerprint sensor using a light source, the fingerprint recognition rate may be determined according to the position of touch area for fingerprint recognition, the change of a fingerprint image according to the state of finger pressing, the time when the fingerprint image is acquired, and the time when the light source is activated.

When the position of the touch area for fingerprint recognition is not correct, the fingerprint image is not accurate according to the finger state (wet state/dry state), or a difference occurs between the time of acquiring biometric information and the time of activating the light source, the fingerprint recognition rate may be lowered.

In accordance with an aspect of the disclosure, an electronic device includes a display including a plurality of pixels, a display driving circuit for driving the plurality of pixels, a pressure sensor disposed adjacent to the display, a biometric sensor connected to the display driving circuit through a designated interface and disposed in at least some area of the display, and a processor. The processor may be configured to receive an input of an external object for the at least some area using the pressure sensor, the receiving operation including an operation of identifying the intensity of pressure corresponding to the input for the at least some area, to transmit an instruction for turning on at least some pixels corresponding to the at least some area among the plurality of pixels to the display driving circuit when the intensity of pressure satisfies a designated condition, and to transmit another instruction related to the acquisition of biometric information to the biometric sensor such that the biometric sensor acquires the biometric information about the external object in response to a signal corresponding to the instruction transmitted from the display driving circuit through the designated interface.

In accordance with an aspect of the disclosure, an electronic device includes a display including a plurality of pixels, a display driving circuit for driving the plurality of pixels, a pressure sensor disposed adjacent to the display, a biometric sensor connected to the display driving circuit through a designated interface and disposed in at least some area of the display, and a processor. The processor may be configured to receive an input of an external object for the at least some area using the pressure sensor, the receiving operation including an operation of identifying the intensity of pressure corresponding to the input for the at least some area, to transmit an instruction for acquiring biometric information about the external object using the biometric sensor to the biometric sensor when the intensity of pressure satisfies a designated condition, and to transmit another instruction related to the acquisition of biometric information to the display driving circuit such that the display driving circuit turns on at least some pixels corresponding to the at least some area among the plurality of pixels in response to a signal corresponding to the instruction transmitted from the biometric sensor through the designated interface.

In accordance with an aspect of the disclosure, an electronic device includes a display including a plurality of pixels, a display driving circuit for driving the plurality of pixels, a pressure sensor disposed adjacent to the display, a biometric sensor disposed in at least some areas of the display, and a processor. The processor may be configured to receive an input of an external object for the at least some area using the pressure sensor, the receiving operation including an operation of identifying the intensity of pressure corresponding to the input for the at least some area, to output light using at least some pixels corresponding to the at least some area among the plurality of pixels, and to acquire biometric information about the external object using the light when the intensity of pressure satisfies a designated condition.

In accordance with an aspect of the disclosure, a fingerprint recognition method of an electronic device includes receiving an input of an external object for at least some area of the display using a pressure sensor disposed adjacent to a display, identifying the intensity of pressure corresponding to the input of the external object, transmitting an instruction for turning on at least some pixels corresponding to the at least some area among a plurality of pixels included in the display to a display driving circuit when the intensity of pressure satisfies a designated condition, and transmitting another instruction related to acquisition of biometric information to a biometric sensor such that the biometric sensor disposed in at least some area of the display acquires biometric information about the external object in response to a signal corresponding to the instruction transmitted from the display driving circuit though a designated interface.

In accordance with an aspect of the disclosure, a fingerprint recognition method of an electronic device includes receiving an input of an external object for at least some area of a display using a pressure sensor disposed adjacent to the display, identifying the intensity of pressure corresponding to the input of the external object, transmitting an instruction for acquiring biometric information about the external object to a biometric sensor disposed in at least some area of the display when the intensity of pressure satisfies a designated condition, using the biometric sensor and transmitting another instruction related to acquisition of biometric information to the display driving circuit such that the display driving circuit turns on at least some pixels corresponding to the at least some area among the plurality of pixels in response to a signal corresponding to the instruction transmitted from the biometric sensor though a designated interface.

In accordance with an aspect of the disclosure, a fingerprint recognition method of an electronic device includes receiving an input of an external object for at least some area of a display using a pressure sensor disposed adjacent to the display, identifying the intensity of pressure corresponding to the input of the external object, outputting light using at least some pixels corresponding to the at least some area among a plurality of pixels included the display when the intensity of pressure satisfies a designated condition, and acquiring biometric information about the external object using the light.

In accordance with an aspect of the disclosure, an electronic device includes a display, at least one sensor disposed adjacent to the display, a biometric sensor disposed in at least some area of the display, and at least one processor. The at least one processor is configured to receive an input by an external object for the at least some area using the at least one sensor or the biometric sensor, and to acquire, based at least in part on the input by the external object, biometric information about the external object using the biometric sensor.

In accordance with an aspect of the disclosure, in a non-transitory storage medium storing instructions, the instructions are configured to cause at least one processor to perform at least one operation when executed by the at least one processor. The at least one operation includes receiving an input of an external object for at least some area of a display using at least one sensor disposed adjacent to the display or a biometric sensor disposed in at least some area of the display, and acquiring, based at least in part on the input by the external object, biometric information of the external object using the biometric sensor.

According to various embodiments, the fingerprint recognition rate can be increased according to the accuracy of the position of a touch area for fingerprint recognition, the accuracy of the fingerprint image according to the finger state (wet state/dry state), or the coincidence of the time of acquiring a fingerprint image with the time of activating the light source.

BRIEF DESCRIPTION OF THE DRAWINGS

FIG. 4 is a view illustrating a biometric information recognition area in a display device of the electronic device according to various embodiments.

FIG. 5 is a view illustrating touch pressure according to the biometric information state in a display device of the electronic device according to various embodiments.

FIGS. 14 to 16C are views illustrating a biometric information recognition method in an electronic device according to various embodiments.

DETAILED DESCRIPTION

Figure 1:
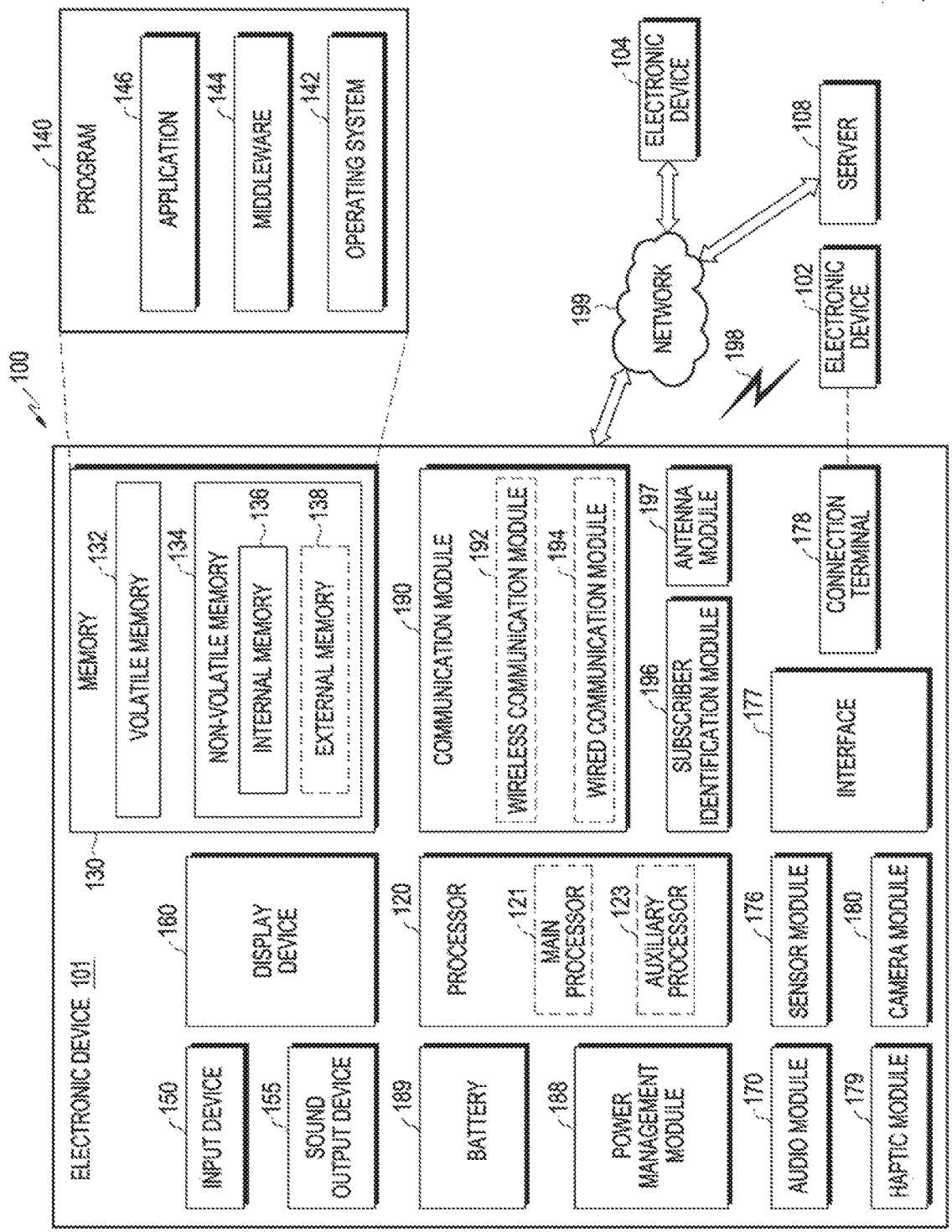
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
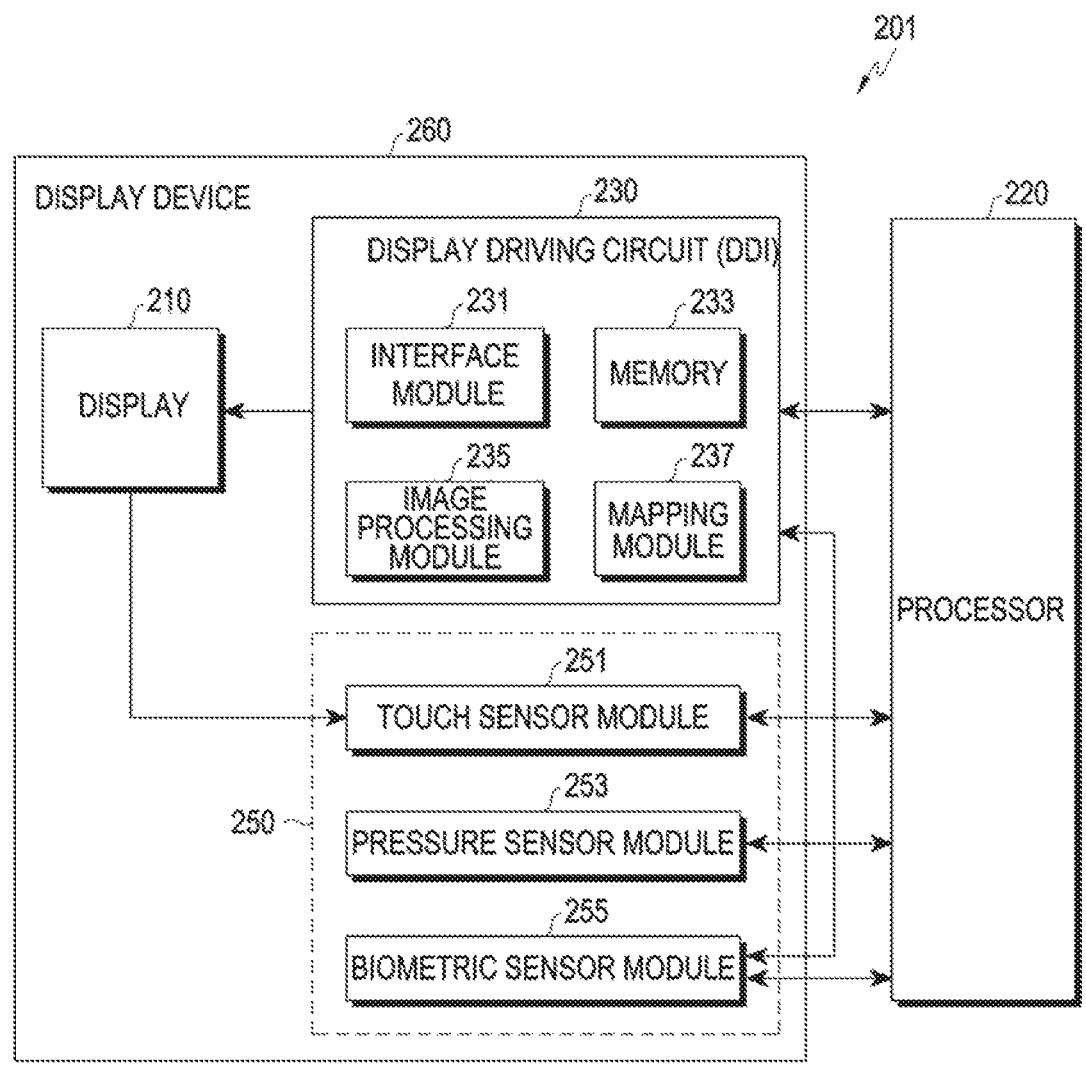
FIG. 2 is a block diagram of the electronic device according to various embodiments.

FIG. 2 is a block diagram of the electronic device (e.g., electronic devices 101, 102 or 104 of FIG. 1) according to various embodiments.

Referring to FIG. 2, the electronic device may include a display device 260 (e.g., display device 160 of FIG. 1) and a processor 220 (e.g., processor 120 of FIG. 1).

The display device 260 may include a display 210 including a plurality of pixels, and a display driving circuit 230 (e.g., display driver IC (DDI)) for driving the plurality of pixels.

The display 210 may include a display panel, and the display panel (not shown) may include a plurality of pixels that can output light.

The display driving circuit 230 may include an interface module 231, a memory 233 (e.g., buffer memory), an image processing module 235, or a mapping module 237. The display driving circuit 230 may, for example, receive image data or image information including an image control signal corresponding to a command for controlling the image data from the processor 220 through the interface module 231. The display driving circuit 230 may communicate with a sensor module 250 (e.g., sensor module 176 of FIG. 1) through the interface module 231. In addition, the display driving circuit 230 may store at least some of the received image information in the memory 233, for example, in units of frames. The image processing module 235 may, for example, perform pre-processing or post-processing (e.g., adjusting resolution, brightness, or size) at least a portion of the image data based on at least a characteristic of the image data or a characteristic of the display 210. The mapping module 237 may convert the image data pre-processed or post-processed the image processing module 235 into a voltage value or a current value capable of driving the pixels, based at least in part on the characteristics of the pixels (e.g., the arrangement of the pixels (e.g., RGB stripe of pentile) or the size of each of the pixels) of the display. At least some pixels of the display 210 may, for example, be driven based on the voltage value or the current value so that visual information (e.g., text, image or icon) corresponding to the image data may be displayed on the display 210.

According to an embodiment, when an instruction for turning on pixels is received from the processor 220, the display driving circuit 230 may turn on at least some pixels corresponding to at least some area among a plurality of pixels included in the display 210 to output light. The at least some area may include a biometric information recognition area (e.g., fingerprint recognition area) capable of receiving an input of an external object for biometric information authentication. According to an embodiment, the display driving circuit 230 may output light by turning on at least some pixels corresponding to at least some areas among a plurality of pixels included in the display 210 in response to the reception of an instruction to turn on the pixels from the processor 220, and transmit a signal informing that the light source is outputting from the display 210 to a biometric sensor module 255.

According to an embodiment, when an instruction to turn on at least some pixels corresponding to at least some area (e.g., biometric information recognition area) among the plurality of pixels included in the display 210 are received from the processor 220 and a signal informing that the biometric sensor module 255 is ready for acquiring biometric information is received, the display driving circuit 230 may output light by turning on at least some pixels corresponding to at least some area among the plurality of pixels included in the display 210.

According to an embodiment, when the signal informing that the biometric sensor module 255 is ready for acquiring biometric information is received from the biometric sensor module 255, the display driving circuit 230 may output light by turning on at least some pixels corresponding to at least some area among the plurality of pixels included in the display 210.

The display device 260 may include a sensor module 250 (e.g., sensor module 176 of FIG. 1), and the sensor module 250 may include a touch sensor module 251, a pressure sensor module 253 or the biometric sensor module 255. According to an embodiment, the sensor module 250 may be disposed between the pixels of the pixel layer of the display 210, or over or below the pixel layer.

The touch sensor module 251 may detect a touch input or a hovering input for a specific position by measuring a change in a signal (e.g., voltage, quantity of light, resistance, or charge amount) for the specific position of the display 210 and provide information (e.g., position, area, pressure, or time) about the detected touch input or hovering input to the processor 220. According to an embodiment, at least a portion (e.g., touch sensor IC) of the touch sensor module 251 may be included as a part of the display driving circuit 230 or the display 210, or as a part of other components (e.g., auxiliary processor 123 of FIG. 1) disposed outside the display device 260.

According to an embodiment, the touch sensor module 251 may transmit a touch input signal of an external object input to at least some area (e.g., biometric information recognition area) of the display 210 or in a first area within the at least some area for biometric information authentication to the processor 220.

The pressure sensor module 253 may acquire touch intensity information corresponding to the touch input of the external object input to a portion or at least some area (e.g., biometric information recognition area) of the display 210 or a first area within the at least some area.

According to an embodiment, when a touch input of an external object occurs in at least some area (e.g., biometric information area) or a first area within the at least some area of the display 210 for biometric information authentication, the pressure sensor module 253 may acquire the intensity information of a touch pressure corresponding to the touch input of the external object to transmit the intensity information to the processor 220. For another example, when the sensor module 250 embedded in the display device 260 includes a pressure sensor module, the electronic devices according to various embodiments disclosed herein may be various types of devices. The electronic device may, for example, include at least one of a portable communication device (e.g., smartphone), a computer device, a portable multimedia device, a portable medical device, a camera, a wearable device, and a home appliance. According to an embodiment, the electronic devices are not limited to those described above.

According to an embodiment, based at least in part on an input by an external object, the pressure sensor module 253 may transmit a signal for activating the biometric sensor module 255 to the biometric sensor module 255.

The biometric sensor module 255, which is an image sensor module for biometric information recognition, may include at least one biometric sensor and may acquire biometric information (e.g., fingerprint image) associated with a touch input via some area of the display 210 using the at least one biometric sensor.

According to an embodiment, the biometric sensor module 255 may include at least one optical fingerprint sensor as the at least one biometric sensor. The biometric sensor module 255 may use the light source of the display 210 or may include a separate light source. The biometric sensor module 255 may include an image sensor that irradiates a user's finger with light generated from a light source, receives the light reflected from the user's fingerprint, and outputs a fingerprint image.

In an embodiment, the biometric sensor module 255 may acquire a fingerprint image in an area method and/or a swipe method. In the area method, the biometric sensor module 255 may capture the entire fingerprints disposed on the surface of the display 210 at one time. In the swipe method, the biometric sensor module 255 may acquire the entire fingerprint image by continuously capturing and combining fingerprint images of fingers moving across the surface of the display 210.

In an embodiment, the biometric sensor module 255 may include an ultrasonic fingerprint recognition sensor. The biometric sensor module 255 may include an ultrasonic receiver that irradiates a user's finger with an ultrasonic signal generated from an ultrasonic transmitter, receives an ultrasonic signal reflected from the fingerprint of the user's finger, and outputs a fingerprint image.

According to an embodiment, when an instruction for acquiring biometric information of an external object is received from the processor 220 for biometric information authentication and a signal informing that the light of the display 210 is outputting is received from the display driving circuit 230, the biometric sensor module 255 may acquire biometric information (e.g., fingerprint image) of the external object in at least some area (e.g., biometric information recognition area) of the display 210 to transmit the biometric information to the processor 220.

According to an embodiment, when the instruction for acquiring biometric information of an external object is received from the processor 220 for biometric information authentication, the biometric sensor module 255 may transmit a signal informing that the biometric sensor module 255 is ready to acquire the biometric information (e.g., fingerprint image) of the external object in at least some area (e.g., biometric information recognition area) of the display 210 to the display driving circuit 230, and may acquire biometric information (e.g., fingerprint image) about the external object to transmit the biometric information to the processor 220.

According to an embodiment, when a signal informing that light is outputting from the display 210 is received from the display driving circuit 230 for biometric information authentication, the biometric sensor module 255 may acquire biometric information (e.g., fingerprint image) on the external object in at least some area (e.g., biometric information recognition area) of the display 210 to transmit it to the processor 220.

According to an embodiment, based at least in part on an input by an external object, the biometric sensor module 255 may transmit a signal for activating the processor 220 to the processor 220. The processor 220 may control overall operations of the electronic device (e.g., electronic device 101, 102 or 103 of FIG. 1).

The processor 220 may acquire biometric information of an external object according to the intensity of the pressure corresponding to the touch pressure of an external object which is received from the pressure sensor module 253.

According to an embodiment, when the intensity of the touch input corresponding to the touch input of the external object which is generated in at least some area (e.g., biometric information recognition area) of the display 210 received from the pressure sensor module 253 for biometric information authentication satisfies a designated condition, the processor 220 may control the display driving circuit 230 to output light using at least some pixels corresponding to at least some area (e.g., biometric information recognition area) among a plurality of pixels included in the display 210, and may control the biometric sensor module 255 to acquire biometric information of the external object using the light.

According to an embodiment, when the intensity of the touch input corresponding to the touch input of an external object satisfies a designated condition, the processor 220 may transmit to the display driving circuit 230 at least one of an instruction for turning on at least some pixels corresponding to the at least some area among the plurality of pixels included in the display 210, or an instruction for instructing to acquire biometric information (e.g., fingerprint image) of the external object in at least some area (e.g., biometric information recognition area) of the display 210 to the biometric sensor module 255.

According to an embodiment, when the intensity of the touch input corresponding to the touch input of an external object satisfies a designated condition, the processor 220 may transmit at least one of an instruction for turning on at least some pixels corresponding to the at least some area among the plurality of pixels included in the display 210 to the display driving circuit 230 and an instruction for instructing to acquire biometric information of the external object in response to a signal corresponding to the instruction transmitted from the display driving circuit 230 via a designated interface to the biometric sensor module 255.

According to an embodiment, when the intensity of the touch input corresponding to the touch input of an external object satisfies a designated condition, the processor 220 may transmit at least one of an instruction for acquiring biometric information about the external object to the biometric sensor module 255 and an instruction for turning on at least some pixels corresponding to the at least some area among the plurality of pixels in response to a signal corresponding to the instruction received from the biometric sensor module 255 via a designated interface to the display driving circuit 230.

The processor 220 may acquire the biometric information of the external object according to the touch input of the external object which is received from the touch sensor module 251.

According to an embodiment, when the touch input of an external object for at least some area (e.g., biometric information area) of the display 210 is received from the touch sensor module 251 for biometric information authentication, and an area of the touch input corresponding to the touch input of the eternal object includes a first area within the at least some area, and when the intensity of the touch input corresponding to the touch input of the external object which is generated in at least some area (e.g., biometric information area) of the display 210 satisfies a designated condition, the processor 220 may control the display driving circuit 230 to output light using at least some pixels corresponding to at least some area (e.g., biometric information area) among the plurality of pixels included in the display 210, and may control the biometric sensor module 255 to acquire the biometric information about the external object using the light.

According to an embodiment, when the touch area corresponding to the touch input of the eternal object includes the first area within the at least some area, the processor 220 may transmit at least one of an instruction for turning on at least some pixels corresponding to the at least some area among the plurality of pixels included in the display to the display driving circuit 230, and an instruction for acquiring biometric information about the external object in at least some area (e.g., biometric information recognition area) of the display 210 to the biometric sensor module 255.

According to an embodiment, when the touch area corresponding to the touch input of the eternal object includes the first area within the at least some area, the processor 220 may transmit at least one of an instruction for turning on at least some pixels corresponding to the at least some area among the plurality of pixels included in the display 210 to the display driving circuit 230 and an instruction for instructing to acquire biometric information about the external object to the biometric sensor module 255 in response to a signal corresponding to the instruction transmitted from the display driving circuit 230 via a designated interface to the biometric sensor module 255.

According to an embodiment, when the touch area corresponding to the touch input of the external object includes the first area within the at least some area, the processor 220 may transmit at least one of an instruction for acquiring biometric information about the external object to the biometric sensor module 255 and an instruction for turning on at least some pixels corresponding to the at least some area among the plurality of pixels in response to a signal corresponding to the instruction transmitted from the biometric sensor module 255 via a designated interface to the display driving circuit 230.

The processor 220 may acquire biometric information of the external object according to the intensity of the pressure corresponding to the touch input of the external object, received from the pressure sensor module 253, and the touch input of the external object, received from the touch sensor module 251.

According to an embodiment, when the intensity of the touch input corresponding to the touch input of the external object which is generated in at least some area (e.g., biometric information recognition area) of the display 210, received from the pressure sensor module 253 for biometric information authentication satisfies a designated condition, the touch input of the external object for at least some area (e.g., biometric information recognition area) of the display 210 is received from the touch sensor module 251, and the area of the touch input corresponding to the touch input of the external object includes the first area within the at least some area, whereby the processor 220 may control the display driving circuit 230 to output light using at least some pixels corresponding to at least some area (e.g., biometric information area) among the plurality of pixels included in the display 210, and may control the biometric sensor module 255 to acquire the biometric information about the external object using the light.

According to an embodiment, when the intensity of the touch input corresponding to the touch input of the external object satisfies a designated condition and the area of the touch input corresponding to the touch input of the external object includes the first area within the at least some area, the processor 220 may transmit at least one of an instruction for turning on at least some pixels corresponding to the at least some area among the plurality of pixels included in the display 210 to the display driving circuit 230, or an instruction for instructing to acquire biometric information (e.g., fingerprint image) about the external object in at least some area (e.g., biometric information area) of the display 210 to the biometric sensor module 255.

According to an embodiment, when the intensity of the touch input corresponding to the touch input of the external object satisfies a designated condition and the area of the touch input corresponding to the touch input of the external object includes the first area within the at least some area, the processor 220 may transmit at least one of an instruction for turning on at least some pixels corresponding to the at least some area among the plurality of pixels included in the display 210 to the display driving circuit 230, or an instruction for instructing to acquire biometric information about the external object in response to a signal corresponding to the instruction transmitted from the display driving circuit 230 via a designated interface to the biometric sensor module 255.

According to an embodiment, when the intensity of the touch input corresponding to the touch input of the external object satisfies a designated condition and the area of the touch input corresponding to the touch input of the external object includes the first area within the at least some area, the processor 220 may transmit at least one of an instruction for acquiring biometric information about the external object to the biometric sensor module 255, or an instruction for turning on at least some pixels corresponding to the at least some area among the plurality of pixels included in the display 210 to the display driving circuit 230 in response to a signal corresponding to the instruction transmitted from the biometric sensor module 255 via a designated interface to the display driving circuit 230.

According to an embodiment, the processor 220 may be configured to be activated when the input by the external object satisfies a designated condition.

According to an embodiment, the processor 220 may authenticate the biometric information (e.g., fingerprint image) received from the biometric sensor module 255, and then perform an operation (e.g., unlocking, payment settlement authentication, or financial settlement authentication) related to the authentication of the electronic device.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3A:
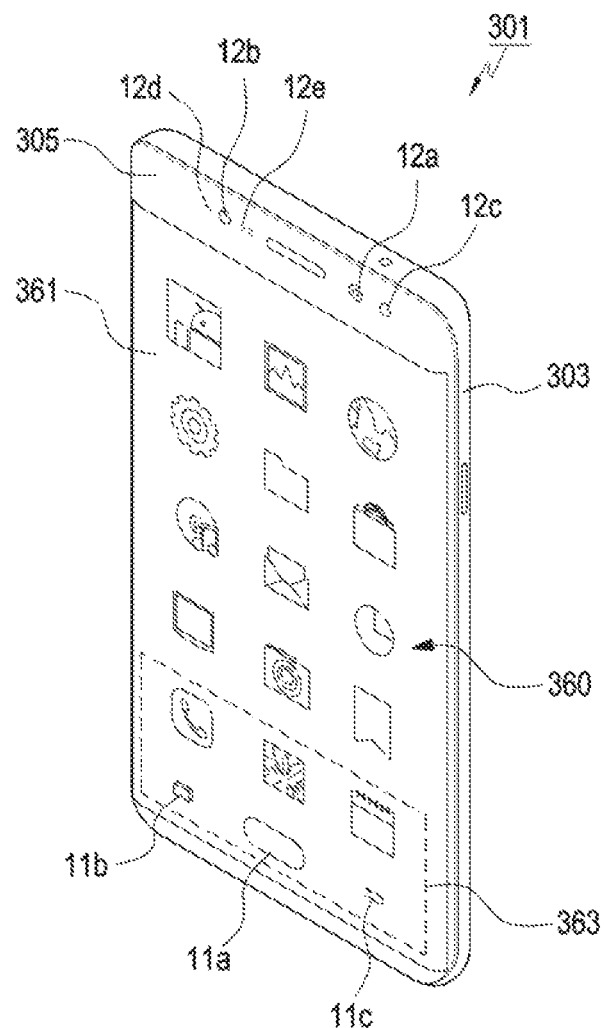
FIG. 3A is a perspective view illustrating the electronic device according to various embodiments.
Figure 3B:
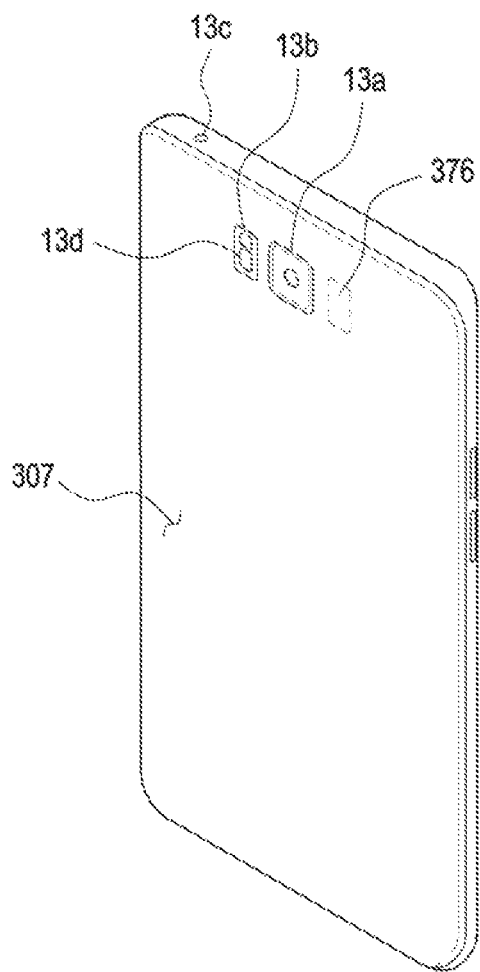
FIG. 3B is a perspective view illustrating the electronic device viewed from another direction.

FIG. 3A is a perspective view illustrating an electronic device according to various embodiments. FIG. 3B is a perspective view illustrating the electronic device viewed according to various embodiments from another direction.

An electronic device 301 (e.g., electronic device 101) may include a housing 303 and a display 360 (e.g., display device 160). The housing 303 may include a front surface 305 or a first surface facing a first direction, and a rear surface 307 or a second surface facing a second direction opposite to the first surface and the front surface 305. The rear surface 307 of the housing 303 may be a rear cover.

At least a portion of the front surface 305 of the housing 303 may be open. The display 360 may include a transparent cover 361 (or window, or cover glass). The display 360 may be mounted to the housing 303 such that the cover 361 forms at least a portion of the front surface 305 of the electronic device 301/the housing 303. The cover 361 may be disposed to close the open front surface 305 of the housing 303.

In an embodiment, the electronic device 301 may include mechanically operating buttons, touch keys 11a, 11b, and 11c, or a keypad including at least one thereof on the front surface 305 of the housing 303 or on one side of the display 360. The touch keys 11a, 11b, and 11c may detect a user's touch input.

The housing 303 may accommodate various electronic components and the like. At least a portion of the housing 303 may be formed of a conductive material. The housing 303 may include sidewalls that form an outer surface of the electronic device 301. A printed circuit unit (not shown) and/or a battery (e.g., battery 189) may be accommodated in the housing 303. For example, at least one of a processor (e.g., processor 120), a communication module (e.g., communication module 190), various interfaces (e.g., interface 177), or a power management module (e.g., power management module 188) may be mounted on the printed circuit unit (not shown) in the form of an integrated circuit chip.

According to an embodiment, the electronic device 301 may include a first camera 12a (e.g., camera module 180), a light source unit 12b, or an iris camera 12c in an upper front area. For example, the light source unit 12b may include an IR LED, and the iris camera 12c may photograph an eye or iris of a user, illuminated with red near infrared rays output from the IR LED.

According to an embodiment, the electronic device 301 may include a light source unit indicator 12d, an illumination sensor and/or a proximity sensor 12e in the upper front area.

According to an embodiment, the electronic device 301 may include a second camera 13a (e.g., camera module 180), a heart rate monitor (HRM) 13d, and/or a flash 13b on the rear surface 307. The electronic device 301 may include a microphone 13c in an upper area.

The display 360 may be exposed through the front surface 305 of the housing 303. The display 360 may include the cover 361 and a display panel. In an embodiment, the display 360 may include a touch panel disposed between the cover 361 and the display panel. The display 360 may output a home screen or an application screen. The display 360 may detect a touch input on the home screen or the application screen.

According to an embodiment, the electronic device 301 may include a rear cover for protecting the rear surface 307 of the housing 303. The rear cover may be mounted to the housing 303 to face a direction (second direction) opposite to the display 360. The rear cover may form the appearance of the electronic device 301 together with the housing 303 and the display 360.

According to various embodiments, at least some of an active area (or an area where display pixels are actually disposed, or an area that displays a screen) of the display 360 or a biometric information recognition area 363 may be provided as a biometric sensor (e.g., fingerprint sensor) for recognizing biometric information (e.g., fingerprint) or a portion thereof.

According to various embodiments, a biometric sensor (e.g., fingerprint sensor) may be disposed below at least some area 363 of the active area (or an area where the display pixels are actually disposed, or the area that displays a screen) of the display 360, and the biometric information (e.g., fingerprint) may be authenticated via an image corresponding to a user input acquired through the some area 363. The some area 363 may be provided as a biometric information area (e.g., fingerprint recognition area).

According to an embodiment, as illustrated in FIG. 3B, a biometric sensor 376 may be provided on the rear surface 307 of the electronic device 301.

FIG. 4 is a view illustrating a biometric information recognition area in a display device of an electronic device according to various embodiments.

Referring to FIG. 4, in order to perform biometric information authentication of an electronic device, information related to the living body may be acquired via at least some area 400 (e.g., fingerprint recognition area) of a display. According to an embodiment, the biometric information recognition area 400 may include a first area 410 for substantial recognition of biometric information. The first area may include a quarter area of the biometric information recognition area 400 and may be positioned at the center of the biometric information recognition area 400. According to an embodiment, when a touch input of an external object occurs in the biometric information recognition area 400 and a touch area corresponding to the touch input of the external object includes the first area 410, biometric information of the external object may be acquired by controlling a display driving circuit (e.g., 230 of FIG. 2) or a biometric sensor module (e.g., 255 of FIG. 2). According to an embodiment, as biometric information of the external object is acquired when the touch area corresponding to the touch input of the external object includes a first area 410 included in the biometric information recognition area 400, even if a user's finger which is an external object, touches at the center of the biometric information recognition area 400 as shown in FIG. 4A, or touches at the side of the biometric information recognition area 400 as shown in FIG. 4B, the biometric information (e.g., fingerprint image) may be maintained without change in the quality.

FIG. 5 is a view illustrating a touch pressure according to biometric information states in a display device of an electronic device according to various embodiments. FIG. 5 illustrates biometric information (e.g., fingerprint image) that is changed according to a touch input for biometric information recognition and the state (wet state/dry state) of an external object (e.g., finger).

According to an embodiment, in order to acquire biometric information on an external object, a condition may be designated in advance for the intensity of the touch pressure corresponding to the touch input of the external object which is received from the pressure sensor module (e.g., 253 of FIG. 2), and the designated condition may be changed by the user's selection or by the finger state.

According to an embodiment, when the pressure intensity of the touch input corresponding to the touch input of the external object which is received from the pressure sensor module (e.g., 253 of FIG. 2) satisfies the designated condition, a processor (e.g., processor 220 of FIG. 2) may control at least one of a biometric sensor module (e.g., biometric sensor module 255 of FIG. 2) or a display driving circuit (e.g., display driving circuit 230 of FIG. 2) to acquire biometric information of the external object.

According to an embodiment, the designated condition may, for example, be a condition that the intensity of the touch input corresponding to the touch input of the external object includes "100-150".

According to FIG. 5, when a touch input is generated with a finger, which is an external object, of wet states 501a and 501b and the pressure intensity values of the touch inputs are "10" and "150", the image score is "25.05" in a good state. When a touch input is generated with a finger of dry states 503a and 503b and the pressure intensity value of the touch input is "10", the image score is "21.36" in a not good state. Further, when a touch input is generated with the finger of dry states 503a and 503b and the pressure intensity value of the touch input is "150", the image score is "25.02" in a good state. Accordingly, the range of pressure intensity values corresponding to a designated condition for acquiring a fingerprint image, which is good biometric information, when a touch is input with a finger in the wet states 501a and 501b and when a touch is input with a fingers in the dry states 503a and 503b may, for example, include "100-150". The range of pressure intensity values corresponding to a designated condition may include a pressure intensity value that can prevent breakage of the display, and may include a pressure intensity value that does not exceed the pressure acquired for the operation of the home key or power key of the electronic device.

Figure 6A:
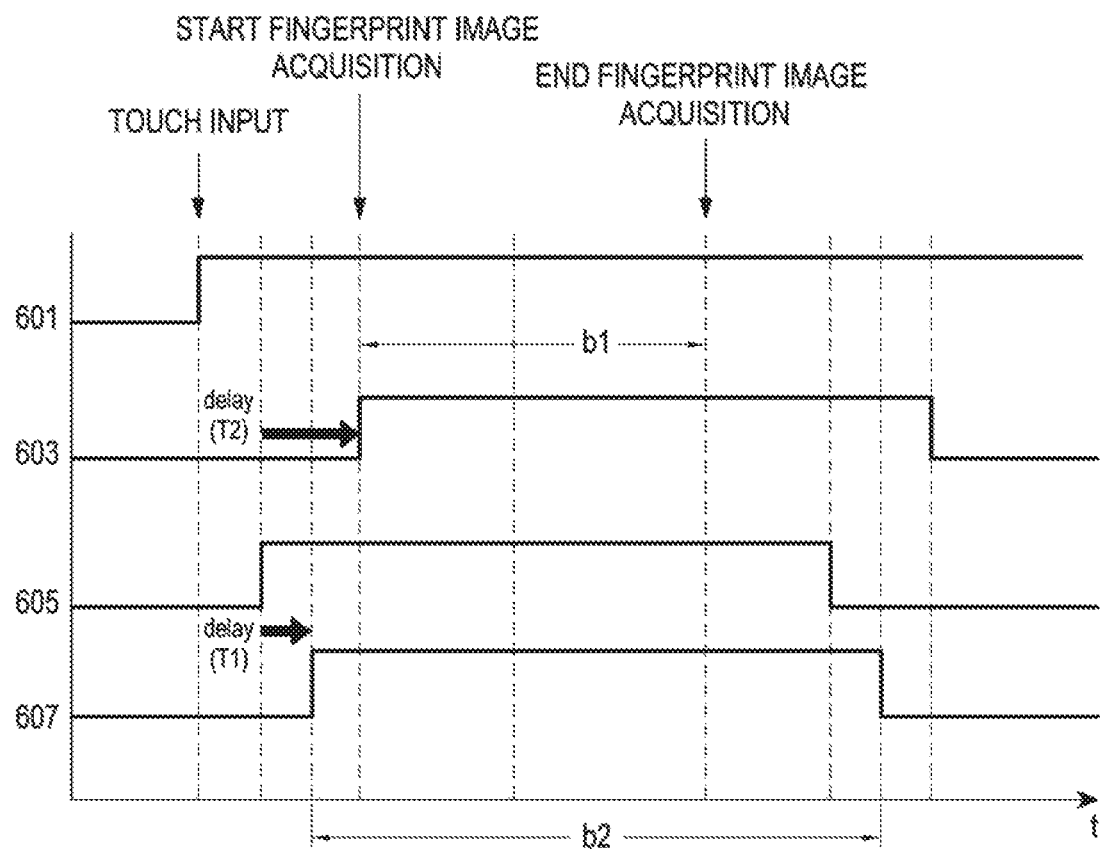
FIGS. 6A and 6B are views illustrating a time when the light of a display is output and a time when biometric information is acquired in a display device of the electronic device according to various embodiments.
Figure 6B:
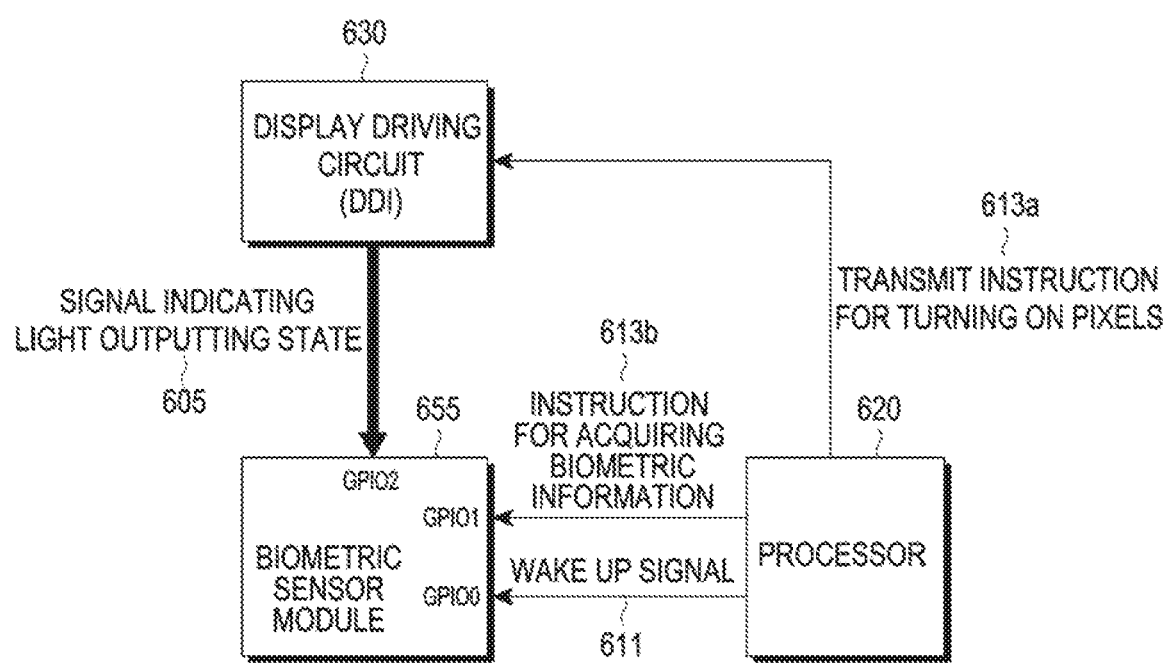

FIGS. 6A and 6B are views illustrating a timing point at which the light of a display is output and a timing point of acquiring biometric information in a display device of an electronic device according to various embodiments.

When a touch input by an external object is detected in at least some area (e.g., biometric information recognition area) of a display, a processor (e.g., processor 220 of FIG. 2) may control a display driving circuit (e.g., display driving circuit 230 of FIG. 2) and a biometric sensor module (e.g., biometric sensor module 255 of FIG. 2) to acquire biometric information of the external object. A variable delay may occur according to a driving state of the processor, and thus, the time T1 at which the light of the display is output and the time T2 at which biometric information is acquired may be different, and when the time T1 at which the light of the display is output is different from the time T2 at which biometric information is acquired, the biometric recognition rate may be lowered.

Referring to FIG. 6A, reference numeral 601 denotes a state in which a wake up signal is received from the processor (e.g., processor 220 of FIG. 2) and the biometric sensor module (e.g., biometric sensor module 255 of FIG. 2) wakes up. Reference numeral 603 denotes a state of acquiring biometric information about the external object in the biometric sensor module, as the processor (e.g., processor 220 of FIG. 2) transmits an instruction for acquiring biometric information of the external object which has generated a touch input to at least some area (e.g., biometric information recognition area) of a display (e.g., display 210 of FIG. 2) to the biometric sensor module. Reference numeral 605 denotes a state in which light is output by turning on at least some pixels corresponding to the at least some area, as the processor transmits an instruction for turning on at least some pixels corresponding to the at least some area among a plurality of pixels included in the display to the display driving circuit. Reference numeral 607 denotes a state in which the light of the display is substantially output according to the control of the display driving circuit. Reference numeral b1 denotes the time at which the biometric sensor module acquires biometric information (e.g., fingerprint image). Reference numeral b2 denotes the time at which the light is substantially output from the display.

If the time T1 at which the light of the display is output is delayed compared to the time T2 of acquiring biometric information T1>T2, the light of the display is output while the biometric sensor module acquires (captures) biometric information such that an accurate fingerprint image may not be acquired. In addition, if the acquiring time T2 of biometric information is delayed compared to the time T1 at which the light of the display is output T2>T1, a fingerprint image acquiring (capturing) operation is performed by the biometric sensor module after the light of the display is output such that an unnecessary delay in fingerprint image acquisition may occur.

Referring to FIG. 6B, when the intensity of the touch input corresponding to the touch input of the external object received from a pressure module (e.g., pressure sensor module 253 of FIG. 2) satisfies a designated condition and the area of the touch input of the external object received from a touch sensor module (e.g., touch sensor module 251 of FIG. 2) includes a first area in at least some area (e.g., the biometric recognition area) of the display, in operation 611, a processor 620 (e.g., processor 220 of FIG. 2) may transmit a wake up signal to a biometric sensor module 655 (e.g., fingerprint recognition sensor module 255 of FIG. 2). In operation 613a, the processor 620 may transmit an instruction (e.g., high bright mode on instruction) for turning on at least some pixels corresponding to the at least some area among a plurality of pixels included in the display to a display driving circuit 630 (e.g., display driving circuit 230 of FIG. 2). Further, in operation 613b, the processor 620 may transmit an instruction (e.g., high bright mode on instruction) for acquiring biometric information of the external object to the biometric sensor module 655 (e.g., biometric sensor module 255 of FIG. 2).

In operation 605, the display driving circuit 630 may turn on at least some pixels corresponding to the at least some area among a plurality of pixels included in the display to activate a light source, and may transmit a signal informing that the light of the display is in an output state to the biometric sensor module 655. When the instruction for acquiring biometric information of the external object is received from the processor 620, the biometric sensor module 655 in the wake up state, may prepare to acquire biometric information of the external object, and when the signal informing that the light of the display is in the output state is received from the display driving circuit 630, the biometric sensor module 655 may acquire biometric information (e.g., fingerprint image) and transmit it to the processor 620.

Figure 7:
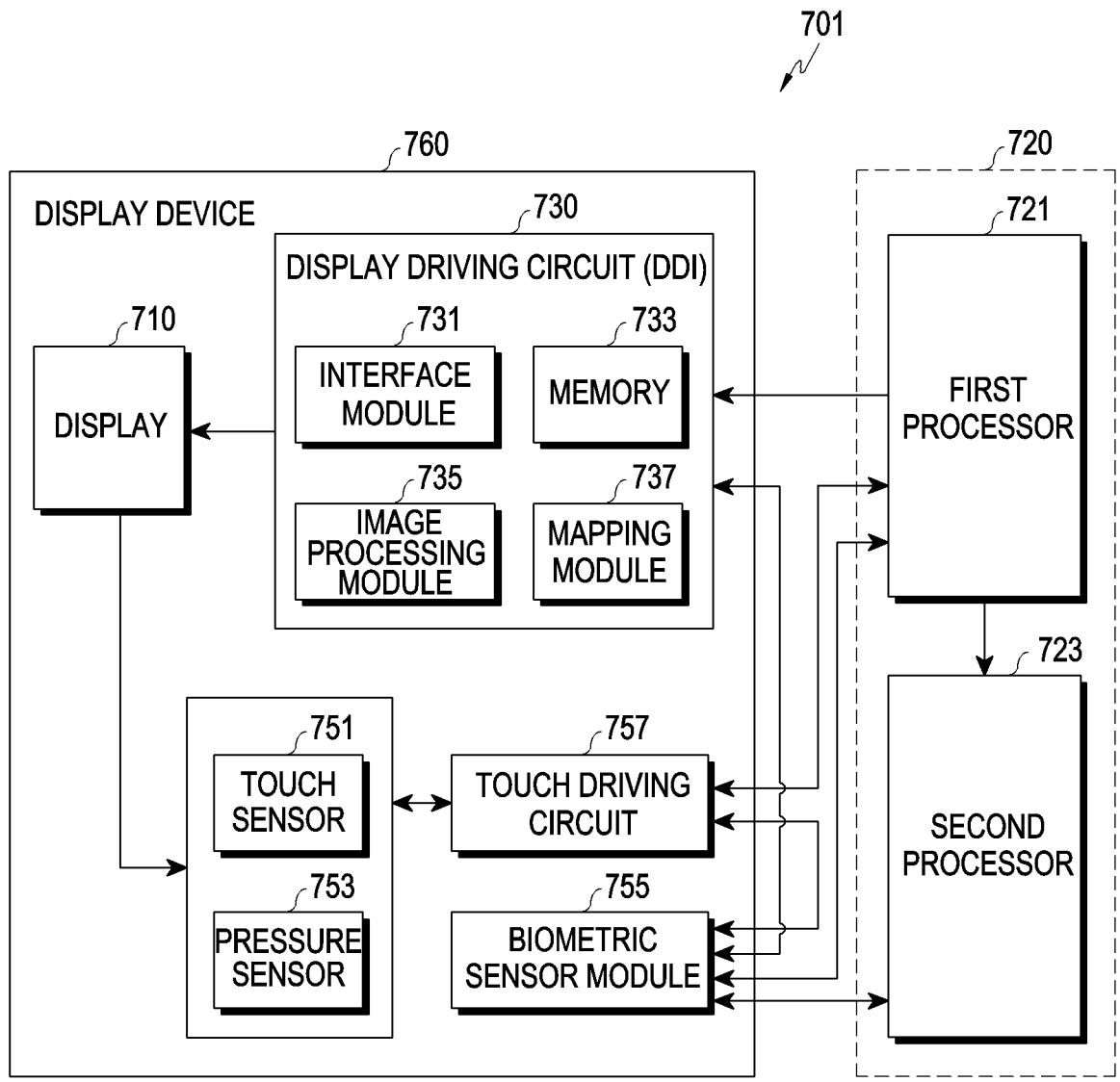
FIG. 7 is a block diagram of an electronic device according to various embodiments.

FIG. 7 is a block diagram of an electronic device (e.g., electronic device 101, 102, or 104 of FIG. 1) according to various embodiments.

Referring to FIG. 7, an electronic device may include a display device 760 (e.g., display device 160 of FIG. 1) and a processor 720 (e.g., processor 120 of FIG. 1).

The display device 760 may include a display 710 including a plurality of pixels, and a display driving circuit 730 (e.g., display driver IC (DDI)) for driving the plurality of pixels.

The display 710 may include a display panel, and the display panel (not shown) may include a plurality of pixels that can output a light source.

The display driving circuit 730 may include an interface module 731, a memory 733 (e.g., buffer memory), an image processing module 735, or a mapping module 737. The display driving circuit 730 may, for example, receive image data or image information including an image control signal corresponding to an instruction for controlling the image data from the processor 720 through the interface module 731. The display driving circuit 730 may communicate with a touch driving circuit 757 controlling a touch sensor 751 and a pressure sensor 753, and a biometric sensor module 755 through the interface module 731. Further, the display driving circuit 730 may store at least some pieces of the received image information in the memory 733, for example, in units of frames. The image processing module 735 may, for example, perform pre-processing or post-processing (e.g., adjusting resolution, brightness, or size) at least some of the image data based on at least the characteristic of the image data or the characteristic of the display 710. The mapping module 737 may convert the image data that is pre-processed or post-processed through the image processing module 735 into a voltage value or a current value capable of driving the pixels, based at least in part on the properties (e.g., arrangement of pixels (RGB stripe or pentile), or size of each of the sub pixels) of the pixels of the display 710. At least some pixels of the display 710 may, for example, be driven based on the voltage value or the current value so that visual information (e.g., text, image, or icon) corresponding to the image data may be displayed on the display 710.

According to an embodiment, when an instruction for turning on the pixels is received from a first processor 721, the display driving circuit 730 may turn on at least some pixels corresponding to at least some areas among a plurality of pixels included in the display 710 to output light. The at least some area may include a biometric information recognition area (e.g., fingerprint recognition area) that can receive an input of an external object for biometric information authentication.

According to an embodiment, according to the reception of the instruction for turning on the pixels from the first processor 721, the display driving circuit 730 may output a light source by turning on at least some pixels corresponding to at least some area of the plurality of pixels included in the display 710, and transmit a signal informing that the light source is output from the display 710 to the biometric sensor module 755.

According to an embodiment, when the instruction for turning on at least some pixels corresponding to at least some area (e.g., biometric information recognition area) among the plurality of pixels included in the display 710 is received from the first processor 721 and the signal informing that the biometric sensor module 755 is ready for acquiring biometric information is received, the display driving circuit 730 may turn on at least some pixels corresponding to at least some area among the plurality of pixels included in the display 710 to output light.

According to an embodiment, when the signal informing that the biometric sensor module 755 is ready for acquiring biometric information is received from biometric sensor module 755, the display driving circuit 730 may turn on at least some pixels corresponding to at least some area among the plurality of pixels included in the display 710 to output light.

According to an embodiment, the display device 760 may include a sensor module (not shown) (e.g., sensor module 176 of FIG. 1), and the sensor module may include the touch driving circuit 757 for controlling the touch sensor 751 and the pressure sensor 753, and the biometric sensor module 755 including at least one biometric sensor or a biometric sensor driving circuit for controlling the biometric sensor. According to an embodiment, the sensor module may be disposed between the pixels of a pixel layer of the display 710, or over or below the pixel layer. According to an embodiment, the touch driving circuit 757 may be embedded in each of the touch sensor 751 and pressure sensor 753, respectively.

According to an embodiment, each of the touch sensor 751 and pressure sensor 753 in which the touch driving circuit 757 is embedded may be implemented as a separate sensor or as a single sensor.

The touch driving circuit 757 may detect a touch input or a hovering input for a specific position by measuring a change in a signal (e.g., voltage, light amount, resistance, or charge amount) of the touch sensor 751 with respect to the specific position of the display 710, and may provide the processor 720 with information (e.g., position, area, pressure, or time) about the detected touch input or hovering input. According to an embodiment, the touch driving circuit 757 may be included as a part of the display driving circuit 730 or the display 710, or a part of other components (e.g., auxiliary processor 123 of FIG. 1) disposed outside the display 760.

The touch driving circuit 757 may acquire touch intensity information corresponding to a touch input of an external object which is input to a portion or at least some area (e.g., biometric information recognition area) of the display 710 or a first area in the at least some area, from the pressure sensor 753 to provide it to the processor 720.

According to an embodiment, when it is determined that an area corresponding to the input of the external object, detected in at least some area (e.g., biometric information recognition area) in the at least some area, for biometric information authentication includes a first area within the at least some area, the touch driving circuit 757 may provide the first processor 721 and the biometric sensor module 755 with an instruction in association with acquisition of biometric information based on the signal received from the touch sensor 751.

According to an embodiment, the touch driving circuit 757 may acquire the intensity of the touch pressure corresponding to the touch input of the external object in the first area within the at least some area (e.g., biometric information recognition area) of the display 710 for biometric information authentication based on the signal received form the pressure sensor 753, and may transmit an instruction in association with acquisition of biometric information to the first processor 721 and the biometric sensor module 755 when the acquired intensity of the touch pressure corresponding to the touch input of the external object satisfies a designated condition.

According to an embodiment, the touch driving circuit 757 may determine that the area corresponding to the input of the external object incudes the first area within the at least some area based on the signal received form the touch sensor 751, and may transmit an instruction in association with acquisition of biometric information to the first processor 721 and the biometric sensor module 755 when the intensity of the touch pressure corresponding to the touch input of the external object satisfies a designated condition based on the signal received from the pressure sensor 753.

According to an embodiment, the touch driving circuit 757 or the pressure sensor 753 may transmit a signal for activating the biometric sensor module 755 to the biometric sensor module 755, based at least in part on the input by an external object.

The biometric sensor module 755, which is an image sensor module for recognizing biometric information, may acquire biometric information (e.g., fingerprint image) related to a touch input via some area of the display 710.

According to an embodiment, the biometric sensor module 755 may include an optical fingerprint sensor. The biometric sensor module 755 may use a light source of the display 710 or include a separate light source. The biometric sensor module 755 may include an image sensor that irradiates a user's fingers with light generated from the light source and receives the light reflected from the user's fingerprint to output a fingerprint image.

In an embodiment, the biometric sensor module 755 may acquire a fingerprint image in an area method and/or a swipe method.

In an embodiment, the biometric sensor module 755 may include an ultrasonic fingerprint recognition sensor. The biometric sensor module 755 may include an ultrasonic receiver that irradiates the user's fingers with an ultrasonic signal generated from an ultrasonic transmitter, receives the ultrasonic signal reflected from the user's fingerprint and outputs a fingerprint image.

According to an embodiment, the biometric sensor module 755 may transmit a signal for activating a processor 720 to the processor 720, based at least in part on the input by the external object.

According to an embodiment, when an instruction related to acquisition of biometric information is received from the touch driving circuit 757, the biometric sensor module 755 may prepare to acquire biometric information (e.g., fingerprint image) for the external object, and acquire biometric information when a signal informing that a light source is output from the display 710 is received from the display driving circuit 730. The biometric sensor module 755 may transmit the acquired biometric information to the second processor 723 when a signal informing completion of communication preparation is received from the second processor 723.

According to an embodiment, when an instruction related to acquisition of biometric information is received from the touch driving circuit 757, the biometric sensor module 755 may transmit a signal informing that it is ready to acquire biometric information (e.g., fingerprint image) about the external object in at least some area (e.g., biometric information area) of the display 710 to the display driving circuit 730, and acquire biometric information (e.g., fingerprint image) about the external object to transmit it to the second processor 723.

The processor 720 may include the first processor 721 and the second processor 723.

The first processor 721 may control overall operations of an electronic device (e.g., electronic device 101, 102 or 103 of FIG. 1).

According to an embodiment, when an instruction related to acquisition of biometric information is received from the touch driving circuit 757, the first processor 721 may transmit an instruction for turning on at least some pixels among a plurality of pixels included in the display 710 to the display driving circuit 730.

According to an embodiment, the first processor 721 may enter a wake up state when an instruction related to acquisition of biometric information is received from the touch driving circuit 757 in a state in which the screen of the display is off, and may transmit a wake up signal to the second processor 723 for biometric information authentication.

According to an embodiment, the processor 720 may be configured to be activated when the input by the external object satisfies a designated condition.

According to an embodiment, the first processor 721 may be configured to transmit a signal for activating the second processor 723 to the second processor 723 when the input by the external object satisfies a designated condition.

According to an embodiment, when biometric information about an external object is received from the second processor 723, the first processor 721 may perform an operation (e.g., unlocking, payment settlement authentication, or financial settlement authentication) related to authentication of the electronic device after authenticating biometric information (e.g., fingerprint image) based on the received biometric information.

The second processor 723 may control a security operation of the electronic device, and for example, may control operations for biometric authentication in the electronic device. The second processor 723 may be configured to be included in or separated from the first processor 721 as a separate module. The second processor 723 may be a trustzone that provides a trusted execution environment that is independent of an open operating system. According to an embodiment, when a wake up signal is received from the first processor 721 while the screen of the display 710 is off, the second processor 723 may prepare for communication (e.g., serial peripheral interface (SPI) communication) with the biometric sensor module 755, and when communication preparation is completed, may transmit a communication ready signal to the biometric sensor module 755.

According to an embodiment, when biometric information (e.g., fingerprint image) is received from the biometric sensor module 755 after the completion of communication preparation with the biometric sensor module 755 is completed, the second processor 723 may transmit the biometric information to the first processor 721 after processing the image of the biometric information.

According to various embodiments, an electronic device 701 may include a display 710 including a plurality of pixels, a display driving circuit 730 for driving the plurality of pixels, a pressure sensor 753 disposed adjacent to the display 710, a biometric sensor module 755 connected to the display driving circuit 730 through a designated interface and disposed in at least some area of the display 710, and a processor 720, wherein the processor 720 may be configured to receive an input of an external object for the at least some area using the pressure sensor 753, the receiving operation including identifying the intensity of pressure corresponding to the input for the at least some area, to transmit an instruction for turning on at least some pixels corresponding to the at least some area among the plurality of pixels to the display driving circuit 730 when the intensity of pressure satisfies a designated condition, and to transmit another instruction related to acquisition of biometric information to the biometric sensor module 755 such that the biometric sensor module 755 acquires biometric information about the external object in response to a signal corresponding to the instruction transmitted from the display driving circuit 730 through the designated interface.

According to various embodiments, the electronic device 701 may further include a touch sensor 751 disposed adjacent to the display 710, wherein the processor 720 may be configured to receive an input of the external object for the at least some areas using the touch sensor 751, the receiving operation including identifying whether the area corresponding to the input of the external object includes a first area within the at least some area, to transmit an instruction for turning on at least some pixels corresponding to the at least some area among the plurality of pixels to the display driving circuit 730 when the area corresponding to the input includes the first area, and to transmit another instruction related to acquisition of biometric information of the external object to the biometric sensor module 755.

According to various embodiments, the electronic device 701 may further include a touch sensor 751 disposed adjacent to the display 710, wherein when the intensity of the input corresponding to the input of the external object which is received using the pressure sensor 753 satisfies a designated condition and the area corresponding to the input of the external object, received using the touch sensor 751 includes the first area within the at least some areas, the processor 720 may be configured to transmit an instruction for turning on some pixels corresponding to the at least some areas among the plurality of pixels to the display driving circuit 730 and to transmit another instruction related to acquisition of biometric information of the external object to the biometric sensor 755.

According to various embodiments, an electronic device 701 may include a display 710 including a plurality of pixels, a display driving circuit 730 for driving the plurality of pixels, a pressure sensor 753 disposed adjacent to the display 710, a biometric sensor module 755 connected to the display driving circuit 730 through a designated interface and disposed in at least some area of the display 710, and a processor 720, wherein the processor 720 may be configured to receive an input of an external object for the at least some area using the pressure sensor 753, the receiving operation including identifying the intensity of pressure corresponding to the input for the at least some area, to transmit an instruction for acquiring biometric information of the external object using the biometric sensor 755 to the biometric sensor 755 when the intensity of pressure satisfies a designated condition, and to transmit another instruction related to acquisition of biometric information to the display driving circuit 730 such that the display driving circuit 730 turns on at least some pixels corresponding to the at least some area among the plurality of pixels in response to a signal corresponding to the instruction transmitted from the biometric sensor 755 via the designated interface.

According to various embodiments, the electronic device 701 may further include a touch sensor 751 disposed adjacent to the display 710, wherein the processor 720 may be configured to receive an input of the external object for the at least some areas using the touch sensor 751, the receiving operation including identifying whether the area corresponding to the input of the external object includes a first area in the at least some area, to transmit an instruction for acquiring biometric information of the external object to the biometric sensor module 755 when the area corresponding to the input includes the first area, and to transmit another instruction for turning on at least some pixels corresponding to the at least some area among the plurality of pixels to the display driving circuit 730.

According to various embodiments, the electronic device 701 may further include a touch sensor 751 disposed adjacent to the display 710, wherein the processor 720 may be configured to transmit the instruction for acquiring biometric information of the external object using the biometric sensor module 755 to the biometric sensor module 755 when the intensity of the input corresponding to the input of the external object which is received using the pressure sensor 753 satisfies a designated condition and the area corresponding to the input of the external object which is received using the touch sensor 751, includes the first area in the at least some area, and to transmit another instruction for turning on at least some pixels corresponding to the at least some area among the plurality of pixels to the display driving circuit 730.

According to various embodiments, an electronic device 701 may include a display 710 including a plurality of pixels, a display driving circuit 730 for driving the plurality of pixels, a pressure sensor 753 disposed adjacent to the display 710, a biometric sensor module 755 disposed in at least some areas of the display 710, and a processor 720, wherein the processor 720 may be configured to receive an input of an external object for the at least some areas using the pressure sensor 753, the receiving operation including identifying the intensity of pressure corresponding to the input to the at least some areas, to output light using at least some pixels corresponding to the at least some area among the plurality of pixels when the intensity of pressure satisfies a designated condition, and to acquire biometric information about the external object using the light.

According to various embodiments, the electronic device 701 may further include a touch sensor 751 disposed adjacent to the display 710, wherein the processor 720 may be configured to receive an input of the external object for the at least some areas using the touch sensor 751, the receiving operation including identifying whether the area corresponding to the input of the external object includes a first area in the at least some area, and to output light using at least some pixels corresponding to the at least some area among the plurality of pixels when the area corresponding to the input includes the first area.

According to various embodiments, the electronic device 701 may further include a touch sensor 751 disposed adjacent to the display 710, wherein the processor 720 may be configured to output light using at least some pixels corresponding to at least some areas among the plurality of pixels when the intensity of the input corresponding to the input of the external object which is received using the pressure sensor 753 satisfies a designated condition and the area corresponding to the input of the external object, received using the touch sensor 751 includes the first area in the at least some areas.

According to various embodiments, the processor 720 may be configured to transmit an instruction to the display driving circuit 730 to output light using some pixels corresponding to the at least some areas among the plurality of pixels, and to transmit another instruction to the biometric sensor module 755 to acquire biometric information of the external object using the light, when the intensity of pressure satisfies a designated condition.

According to various embodiments, an electronic device 701 may include a display 710, at least one sensor 751 and 753 disposed adjacent to the display 710, a biometric sensor module 755 disposed in at least some area of the display 710, and at least one processor 720, wherein the at least one processor 720 may be configured to receive an input of an external object for the at least some areas using the at least one sensor 751 and 753 or the biometric sensor module 755, and based at least in part on the input by the external object, to acquire biometric information about the external object using the biometric sensor module 755.

According to various embodiments, the at least one processor 720 may be configured to acquire biometric information about the external object using the biometric sensor module 755, when the input by the external object satisfies a designated condition.

According to various embodiments, the at least one processor 720 may be configured to transmit a signal for acquiring biometric information about the external object to the biometric sensor module 755, when the input by the external object satisfies a designated condition.

According to various embodiments, the electronic device 701 may further include a display driving circuit 730 for driving the display 710, wherein the at least one processor 720 may be configured to transmit a signal for activating the pixels corresponding to the at least some area among the pixels of the display 710 to the display driving circuit 730, when the input by the external object satisfies the designated condition.

According to various embodiments, the biometric sensor module 755 may be configured to acquire biometric information about the external object, based at least in part of a signal related to the operation state of the display 710.

According to various embodiments, the designated condition may include at least one of a condition in which a value representing the pressure of the external object with respect to the at least some area is equal to or greater than a designated threshold value, or a condition that the at least some area includes a designated area.

According to various embodiments, the electronic device 701 may further include a display driving circuit 730 for driving the display 710, wherein the biometric sensor module 755 may be configured to transmit a signal for activating pixels corresponding to the at least some area among the pixels of the display 710 to the display driving circuit 730, based at least in part of the signal.

According to various embodiments, the biometric sensor module 755 may be configured to transmit a signal for activating the at least one processor 720 to the at least one processor 720, based at least in part on the input by the external object.

According to various embodiments, the at least one sensor 751, 753 may be configured to transmit a signal for activating the biometric sensor module 755 to the biometric sensor module 755, based at least in part on the input by the external object.

According to various embodiments, the at least one processor 720 may be configured to be activated when the input by the external object satisfies a designated condition.

According to various embodiments, the at least one processor 720 may include a first processor 721 for authentication of the biometric information and a second processor 723 for image-processing biometric information, and the first processor 721 may be configured to transmit a signal for activating the second processor 723 to the second processor 723 when the input by the external object satisfies the designated condition.

Figure 8:
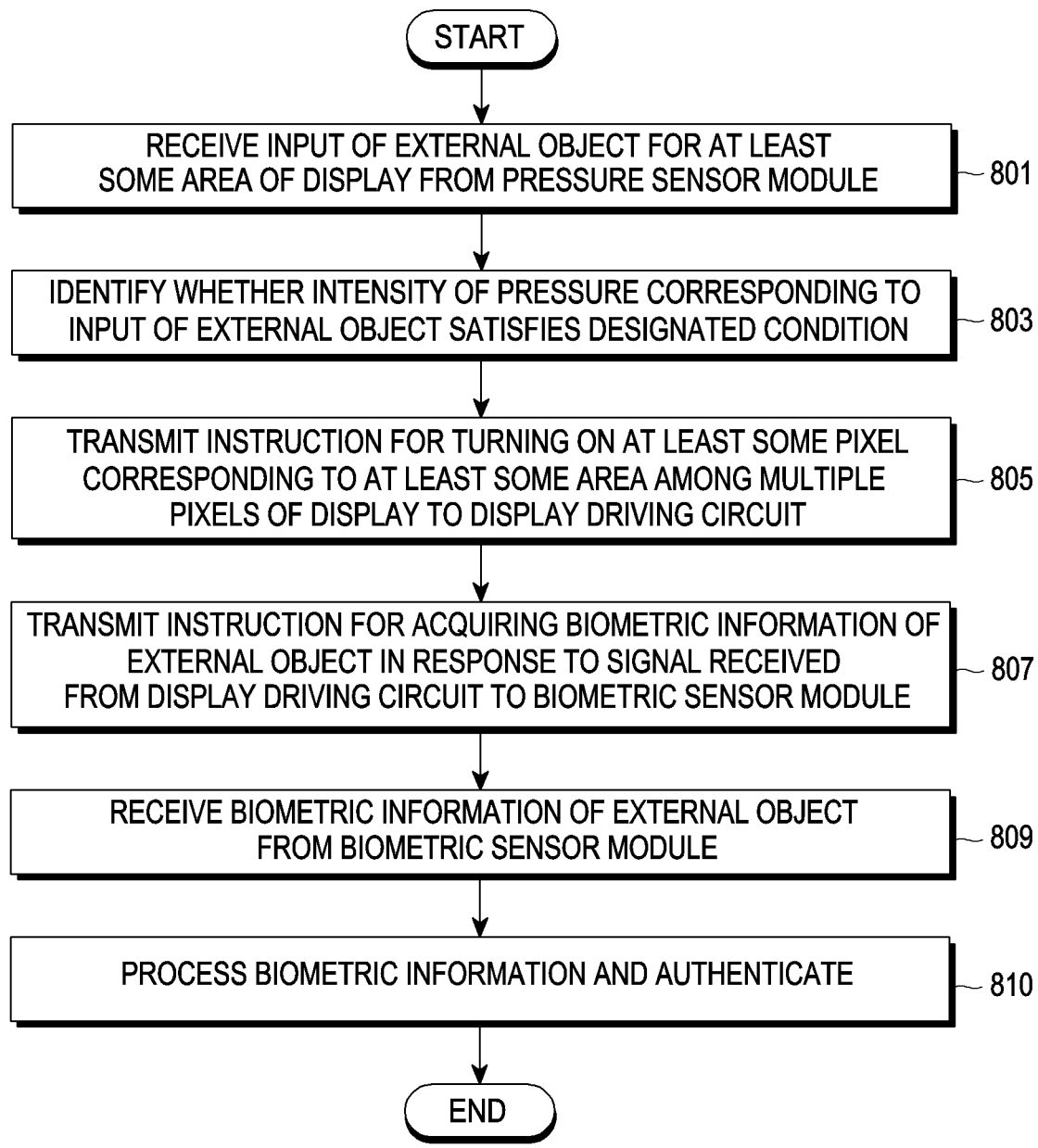
FIG. 8 is a flow chart illustrating a biometric information recognition method in an electronic device according to various embodiments.

FIG. 8 is a flow chart illustrating a biometric information recognition method in an electronic device according to various embodiments. The biometric information recognition method may include operations 801 to 810. The biometric information recognition method may be performed by at least one of an electronic device (e.g., electronic device 101, 201, or 701), at least one processor (e.g., processor 120, 220, or 720) of an electronic device, or a control unit of an electronic device. In an embodiment, at least one of the operations 801 to 810 may be omitted, some operations may be performed in parallel at the same time, some operations may be reversed, or another operation may be added.

Referring to FIG. 8, in operation 801, a processor may receive an input of an external object for at least some area (e.g., biometric information recognition area) of a display (e.g., 210 of FIG. 2) from a pressure sensor module (e.g., 253 of FIG. 2).

In operation 803, the processor may identify whether the intensity of the pressure corresponding to the input of the external object satisfies a designated condition. In operation 803, when the intensity of the pressure corresponding to the input of the external object satisfies a designated condition, in operation 805, the processor may transmit an instruction (e.g., high bright mode on instruction) for turning on at least some pixels corresponding to the at least some area among a plurality of pixels included in the display to a display driving circuit (e.g., 230 of FIG. 2).

In operation 807, the processor may transmit an instruction (e.g., high bright mode on instruction) for acquiring biometric information of the external object in response to a signal informing that the light of the display is outputting from the display driving circuit to the biometric sensor module (e.g., 255 of FIG. 2)

In operation 809, the processor may receive biometric information from the biometric sensor module that acquires biometric information (e.g., fingerprint image) of the external object in response to a signal informing that the light of the display is output from the display driving circuit.

In operation 810, the processor may process biometric information to perform biometric information authentication operations (e.g., unlocking electronic devices, perform payment, enter password, etc.).

Figure 9:
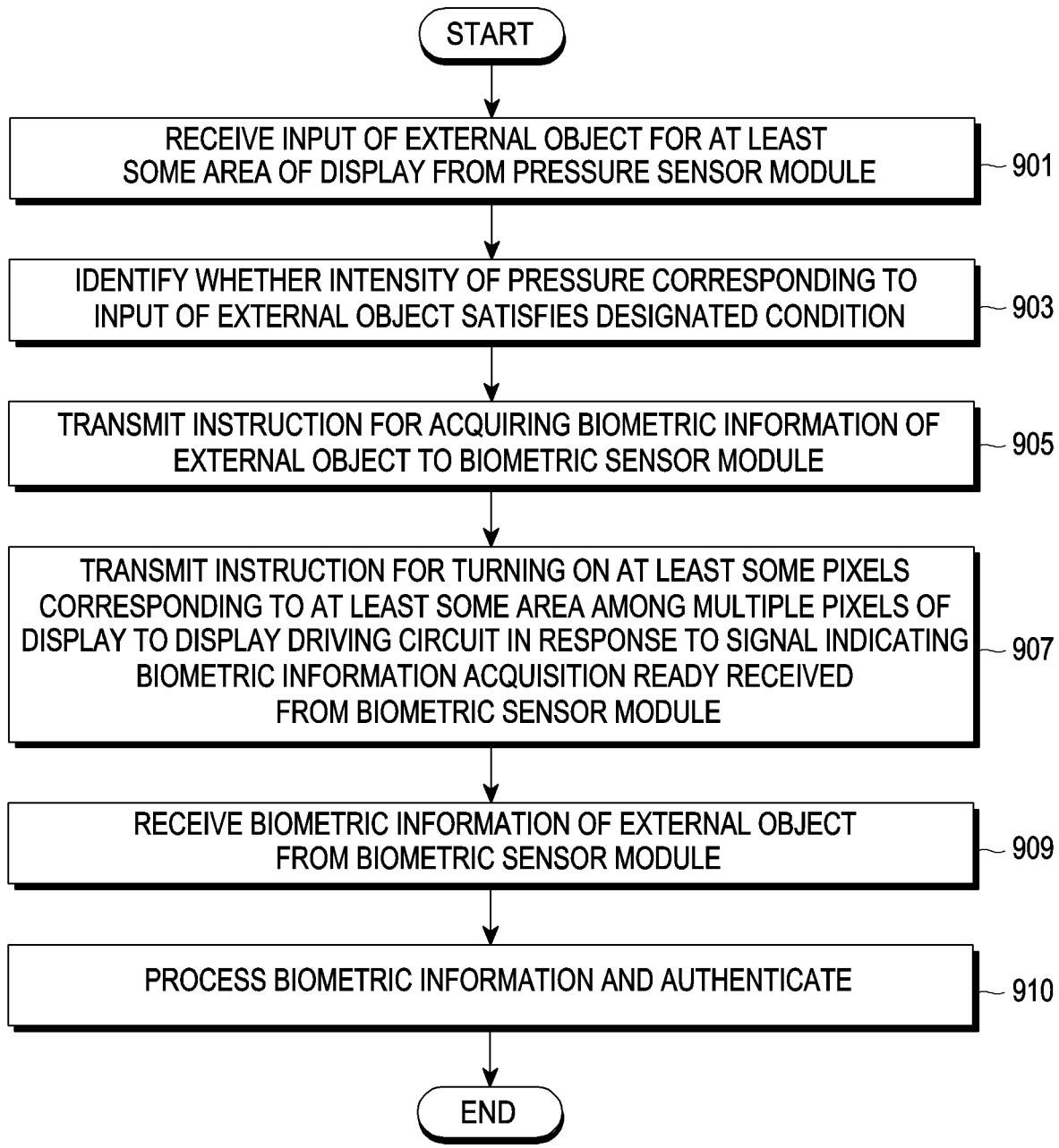
FIG. 9 is a flow chart illustrating a biometric information recognition method in an electronic device according to various embodiments.

FIG. 9 is a flow chart illustrating a biometric information recognition method in an electronic device according to various embodiments. The biometric information recognition method may include operations 901 to 910. The biometric information recognition method may be performed by at least one of an electronic device (e.g., electronic device 101, 201, or 701), at least one processor (e.g., processor 120, 220, or 720) of an electronic device, or a control unit of an electronic device. In an embodiment, at least one of the operations 901 to 910 may be omitted, some operations may be performed in parallel at the same time, some operations may be reversed, or another operation may be added.

Referring to FIG. 9, in operation 901, a processor may receive an input of an external object from at least some area (e.g., biometric recognition area) of the display (e.g., 210 of FIG. 2) from a pressure sensor module (253 of FIG. 2).

In operation 903, the processor may identify whether the intensity of the pressure corresponding to the input of the external object satisfies a designated condition. In operation 903, when the intensity of the pressure corresponding to the input of the external object satisfies a designated condition, the processor may transmit an instruction (e.g., high bright mode on instruction) for acquiring biometric information of the external object to a biometric sensor module (e.g., 255 of FIG. 2), in operation 905.

In operation 907, the processor may transmit an instruction (e.g., high bright mode on instruction) for turning on at least some pixels corresponding to the at least some area among a plurality of pixels included in the display to a display driving circuit (e.g., 230 of FIG. 2), in response to a signal informing that it is ready to acquire biometric information of the external object received from the biometric sensor module.

In operation 909, the processor may receive biometric information from the biometric sensor module that has acquired the biometric information (e.g., fingerprint image) of the external object after transmitting a signal that it is ready to acquire biometric information of the external object to the display driving circuit.

In operation 910, the processor may process the biometric information to perform biometric information authentication operations (e.g., unlocking electronic devices, perform payment, enter password, etc.).

Figure 10:
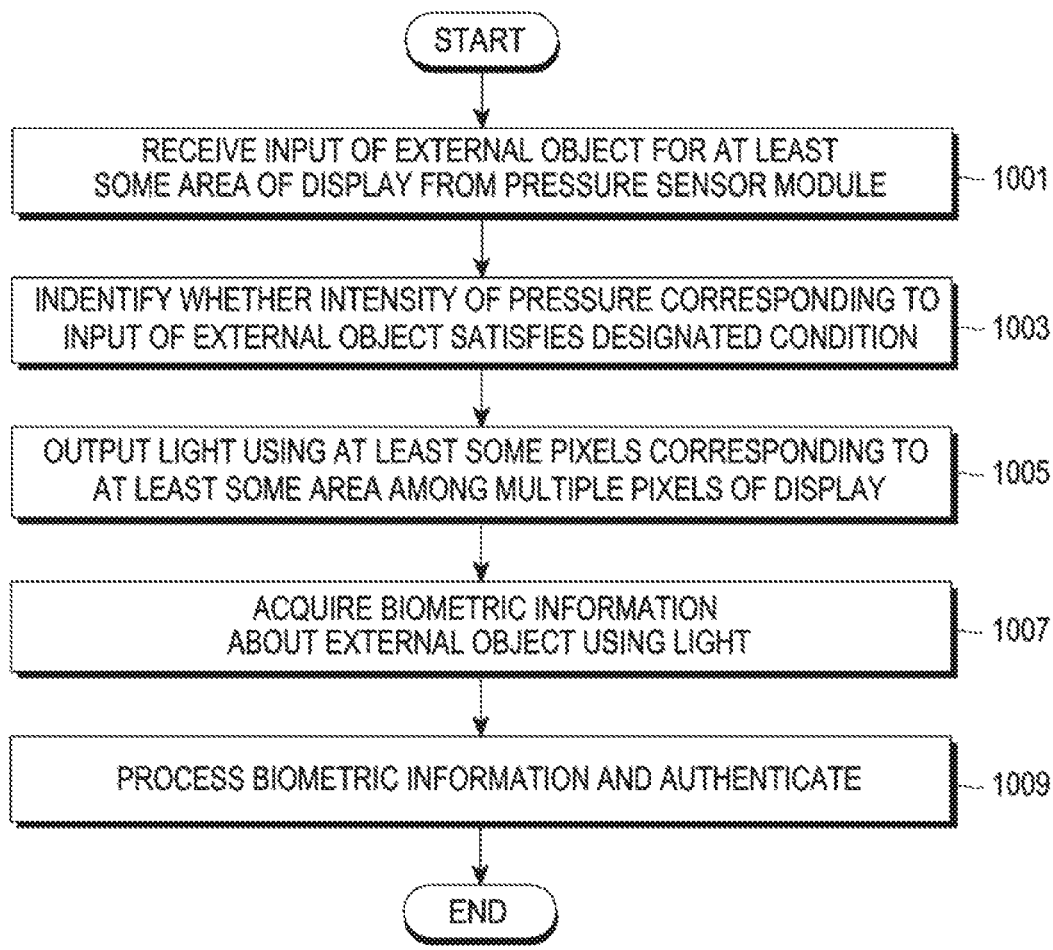
FIG. 10 is a flow chart illustrating a biometric information recognition method in an electronic device according to various embodiments.

FIG. 10 is a flow chart illustrating a biometric information recognition method in an electronic device according to various embodiments. The biometric information recognition method may include operations 1001 to 1009. The biometric information recognition method may be performed by at least one of an electronic device (e.g., electronic device 101, 201, or 701), at least one processor (e.g., processor 120, 220, or 720) of an electronic device, or a control unit of an electronic device. In an embodiment, at least one of the operations 1001 to 1009 may be omitted, some operations may be performed in parallel at the same time, some operations may be reversed, or another operation may be added.

Referring to FIG. 10, in operation 1001, the processor may receive an input of an external object for at least some area (e.g., biometric recognition area) of a display (210 of FIG. 2) from a pressure sensor module (253 of FIG. 2).

In operation 1003, the processor may identify whether the intensity of the pressure corresponding to the input of the external object satisfies a designated condition. In operation 1003, when the intensity of the pressure corresponding to the input of the external object satisfies a designated condition, in operation 1005, the processor may control a display driving circuit (e.g., 230 of FIG. 2) to turn on at least some pixels corresponding to the at least some areas among a plurality of pixels included in the display to output light.

In operation 1007, the processor may control a biometric sensor module (e.g., 255 of FIG. 2) to receive biometric information of the external object acquired using the light from the biometric sensor module.

In operation 1009, the processor may process the biometric information to perform biometric information authentication operations (e.g., unlocking electronic devices, perform payment, enter password, etc.).

Figure 11:
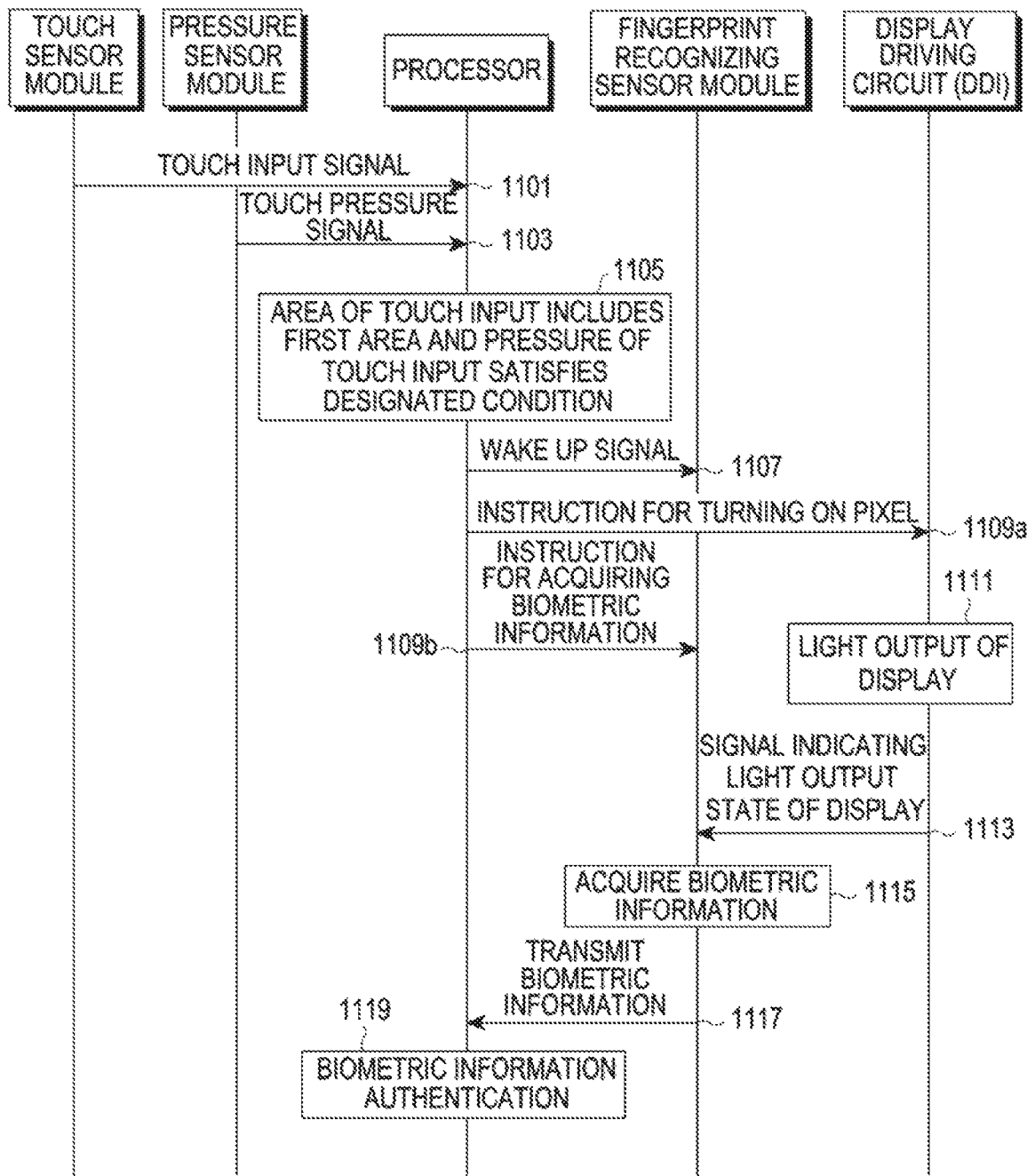
FIG. 11 is a flow chart illustrating a biometric information recognition method in an electronic device according to various embodiments.

FIG. 11 is a flow chart illustrating a biometric information recognition method in an electronic device according to various embodiments. The biometric information recognition method may include operations 1101 to 1119. The biometric information recognition method may be performed by at least one of an electronic device (e.g., electronic device 101, 201, or 701), at least one processor (e.g., processor 120, 220, or 720) of an electronic device, or a control unit of an electronic device. In an embodiment, at least one of the operations 1101 to 1119 may be omitted, some operations may be performed in parallel at the same time, some operations may be reversed, or another operation may be added.

In operation 1101, a touch sensor module (e.g., 251 of FIG. 2) may transmit a touch input of an external object for at least some area (e.g., biometric information recognition area) of a display (e.g., 210 of FIG. 2) to a processor.

In operation 1103, a pressure sensor module (e.g., 253 of FIG. 2) may transmit a pressure intensity corresponding to the input of the external object to the processor.

In operation 1105, when the area corresponding to the touch input of the external object includes a first area in the at least some area and the intensity of the pressure corresponding to the input of the external object satisfies a designated condition, the processor may transmit a wake up signal to a biometric sensor module (e.g., 255 of FIG. 2), in operation 1107.

In operation 1109a, the processor may transmit an instruction (e.g., high bright mode on instruction) for turning on at least some pixels corresponding to the at least some area among a plurality of pixels included in a display to a display driving circuit (e.g., display driving circuit 230 of FIG. 2), and in operation 1109b, the processor may transmit an instruction (e.g., high bright mode on instruction) for acquiring biometric information of the external object to the biometric sensor module.

In operation 1111, the display driving circuit may turn on at least some pixels corresponding to the at least some area among a plurality of pixels included in a display to output light.

In operation 1113, the display driving circuit may transmit a signal informing that light of the display is outputting to the biometric sensor module.

In operation 1115, the biometric sensor module may receive the instruction (e.g., high bright mode on instruction) for acquiring biometric information of the external object from the processor, and may acquire the biometric information (e.g., fingerprint image) of the external object using the light when a signal informing that the light of the display is outputting from the display driving circuit.

In operation 1117, the biometric sensor module may transmit the acquired biometric information to the processor.

In operation 1119, the processor may process the biometric information to perform biometric information authentication operations (e.g., unlocking electronic devices, perform payment, enter password, etc.).

Figure 12:
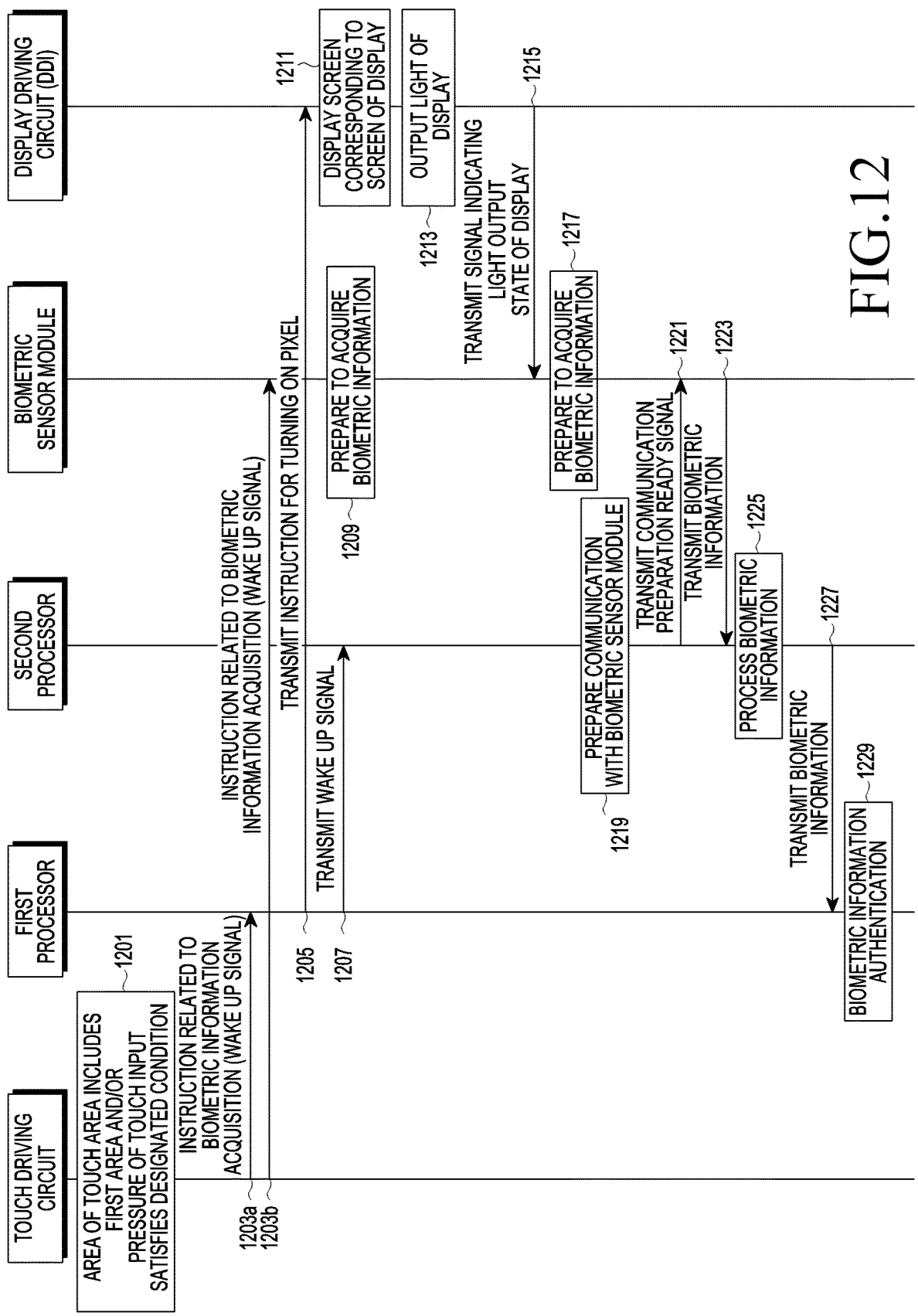
FIG. 12 is a flow chart illustrating a biometric information recognition method in an electronic device according to various embodiments.

FIG. 12 is a flow chart illustrating a biometric information recognition method in an electronic device according to various embodiments. The biometric information recognition method may include operations 1201 to 1229. The biometric information recognition method may be performed by at least one of an electronic device (e.g., electronic device 101, 201, or 701), at least one processor (e.g., processor 120, 220, or 720) of an electronic device, or a control unit of an electronic device. FIG. 12 illustrates a state in which the screen of a display is turned off, as an example. In an embodiment, at least one of the operations 1201 to 1229 may be omitted, some operations may be performed in parallel at the same time, some operations may be reversed, or another operation may be added.

In operation 1201, a touch driving circuit (e.g., 757 of FIG. 7) may determine whether an input of an external object for at least some area (e.g., biometric information recognition area) of a display (e.g., 710 of FIG. 7) includes a first area of the at least some area based on a signal received from a touch sensor (e.g., 751 of FIG. 7). In operation 1201, the touch driving circuit may identify whether an intensity of a touch pressure corresponding to the touch input of the external object satisfies a designated condition based on a signal received from a pressure sensor (e.g., 753 of FIG. 7).

When the input of the external object includes the first area of the at least some area, based on the signal received from the touch sensor, and/or the intensity of the touch pressure corresponding to the touch input of the external object satisfies a designated condition, based on the signal received from the pressure sensor, in operation 1203a, the touch driving circuit (e.g., 757 of FIG. 7) may transmit an instruction related to acquisition of biometric information including a wake up signal to a first processor (e.g., 721 of FIG. 7). At the same time, in operation 1203b, the touch driving circuit (E.G., 757 of FIG. 7) may transmit an instruction related to acquisition of biometric information including a wake up signal to a biometric sensor module (e.g., 755 of FIG. 7).

In operation 1205, the first processor (e.g., 710 of FIG. 7), in a sleep state, may wake up according to the reception of the instruction related to the acquisition of the biometric information received from the touch driving circuit (e.g., 757 of FIG. 7), and then may transmit an instruction for turning on some pixels corresponding to at least some area among a plurality of pixels included in a display (e.g., 710 of FIG. 7) to the display driving circuit.

In operation 1207, the first processor (e.g., 721 of FIG. 7) may transmit a wake up signal to the second processor (e.g., 723 of FIG. 7), in a sleep state.

In operation 1209, the biometric sensor module (e.g., 755 of FIG. 7) may wake up according to the reception of the instruction of acquisition of biometric information, received from the touch driving circuit (e.g., 757 of FIG. 7), and then may wait to receive a signal informing that the light of the display is outputting from the display driving circuit (e.g., 730 of FIG. 7) while preparing to acquire biometric information.

In operation 1211, the display driving circuit (e.g., 730 of FIG. 7) may turn on the screen of the display and display a corresponding screen according to the reception of the instruction for turning on the pixels which is received from the first processor (e.g., 721 of FIG. 7).

In operation 1213, the display driving circuit (e.g., 730 of FIG. 7) may turn on at least some pixels corresponding to at least some area (e.g., biometric information recognition area) among a plurality of pixels included in the display (e.g., 710 of FIG. 7) to output light.

In operation 1215, the display driving circuit (e.g., 730 of FIG. 7) may transmit a signal informing that the light of the display is outputting to the biometric sensor module (e.g., 755 of FIG. 7).

In operation 1217, the biometric sensor module (e.g., 755 of FIG. 7) may acquire biometric information (e.g., fingerprint image) when the signal informing that the light of the display is outputting is received from the display driving circuit (e.g., 730 of FIG. 7) while preparing to acquire biometric information.

In operation 1219, the second processor (e.g., 723 of FIG. 7) may perform communication preparation to perform communication with the biometric sensor module (e.g., 755 of FIG. 7) after waking up according to the wake up signal received from the first processor (e.g., 721 of FIG. 7).

In operation 1221, when the second processor (e.g., 723 of FIG. 7) is ready to perform communication with the biometric sensor module (e.g., 755 of FIG. 7), the second processor (e.g., 723 of FIG. 7) may transmit a signal informing that communication preparation is completed to the biometric sensor module.

In operation 1223, when the signal informing that communication preparation is completed is received from the second processor (e.g., 723 of FIG. 7), the biometric sensor module (e.g., 755 of FIG. 7) may transmit the acquired biometric information (e.g., fingerprint image) to the second processor.

In operation 1225, the second processor (e.g., 723 of FIG. 7) may perform image processing operation for the biometric information received from the biometric sensor module (e.g., 755 of FIG. 7), and in operation 1227, the second processor may transmit the biometric information to which the image processing operation is completed to the first processor (e.g., 721 of FIG. 7).

In operation 1229, the first processor (e.g., 721 of FIG. 7) may perform operations (e.g., unlocking electronic devices, perform payment, enter password, etc.) related to authentication of the electronic device after authenticating the biometric information based on the biometric information (e.g., fingerprint image) received from the second processor (e.g., 723 of FIG. 7).

Figure 13:
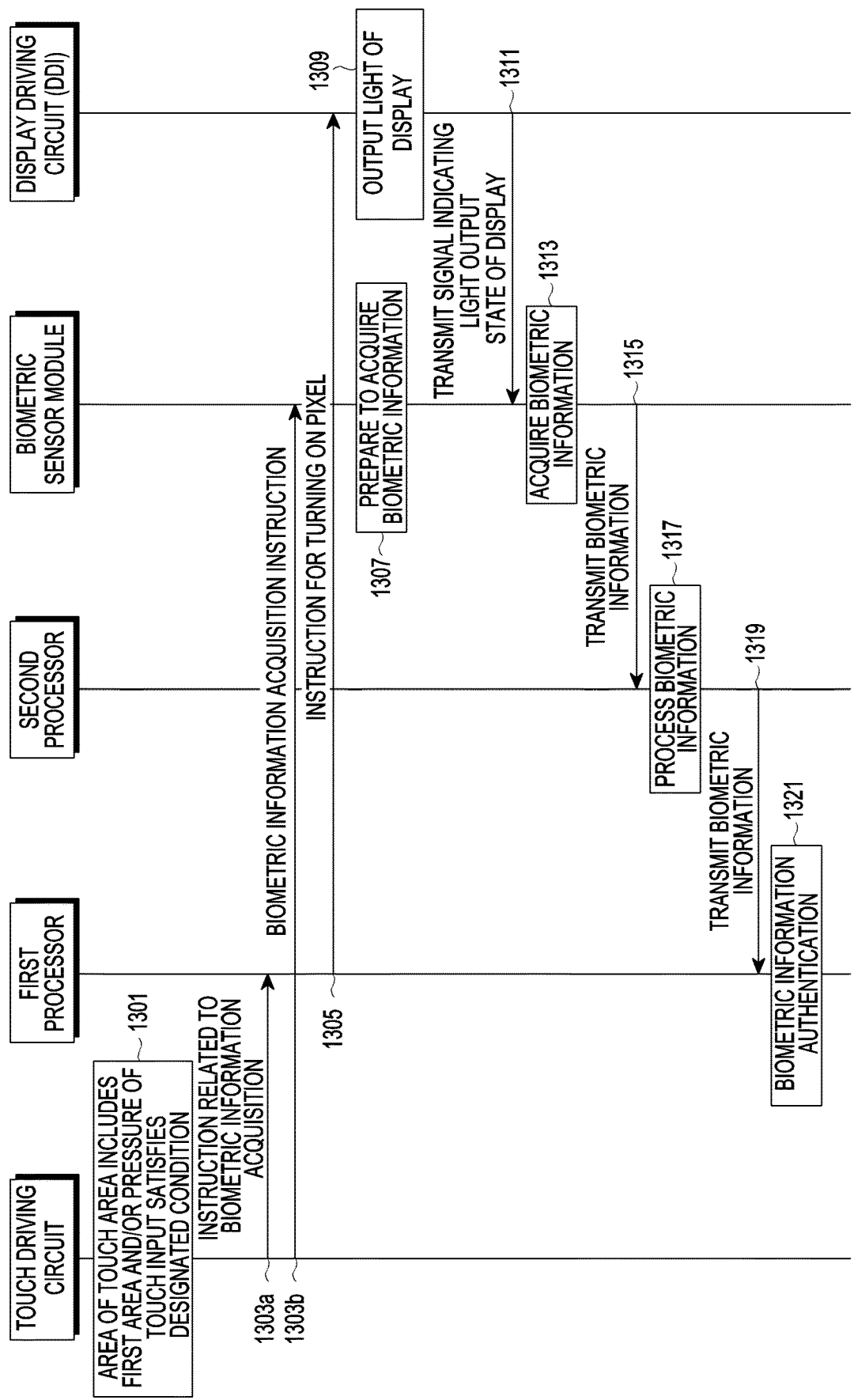
FIG. 13 is a flow chart illustrating a biometric information recognition method in an electronic device according to various embodiments.

FIG. 13 is a flow chart illustrating a biometric information recognition method in an electronic device according to various embodiments. The biometric information recognition method may include operations 1301 to 1321. The biometric information recognition method may be performed by at least one of an electronic device (e.g., electronic device 101, 201, or 701), at least one processor (e.g., processor 120, 220, or 720) of an electronic device, or a control unit of an electronic device. In an embodiment, at least one of the operations 1301 to 1321 may be omitted, some operations may be performed in parallel at the same time, some operations may be reversed, or another operation may be added. FIG. 13 illustrates a state in which the screen of a display is turned on, as an example.

In operation 1301, a touch driving circuit (e.g., 757 of FIG. 7) may identify whether an input of an external object for at least some area (e.g., biometric information recognition area) of a display (e.g., 710 of FIG. 7) includes a first area of the at least some area, based on a signal received from a touch sensor (e.g., 751 of FIG. 7). In operation 1301, the touch driving circuit may identify whether an intensity of a touch pressure corresponding to the touch input of the external object satisfies a designated condition, based on a signal received form a pressure sensor (e.g., 753 of FIG. 7).

When the input of the external object includes the first area of the at least some area, based on the signal received from the touch sensor, and/or the intensity of the touch pressure corresponding to the touch input of the external object satisfies designated condition, based on the signal received from the pressure sensor, in operation 1303a, the touch driving circuit (e.g., 757 of FIG. 7) may transmit an instruction related to acquisition of biometric information to a first processor (e.g., 721 of FIG. 7). At the same time, in operation 1303b, the touch driving circuit (e.g., 757 of FIG. 7) may transmit an instruction related to acquisition of biometric information to a biometric sensor module (e.g., 755 of FIG. 7).

In operation 1305, when the instruction related to acquisition of biometric information is received from the touch driving circuit (e.g., 757 of FIG. 7), the first processor (e.g., 721 of FIG. 7) may transmit an instruction for turning on some pixels corresponding to at least some area among a plurality of pixels included in a display (e.g., 710 of FIG. 7) to the display driving circuit (e.g., 730 of FIG. 7).

In operation 1307, when the instruction related to acquisition of biometric information is received from the touch driving circuit (e.g., 757 of FIG. 7), the biometric sensor module (e.g., 755 of FIG. 7) may wait to receive a signal informing that the light of the display is outputting from the display driving circuit (e.g., 730 of FIG. 7) while preparing to acquire biometric information.

In operation 1309, when the instruction for turning on pixels is received from the first processor (e.g., 721 of FIG.

7), the display driving circuit (e.g., 730 of FIG. 7) may turn on at least some pixels corresponding to at least some area (e.g., biometric information recognition area) among the plurality of pixels included in the display (e.g., 710 of FIG. 7) to output light.

In operation 1311, the display driving circuit (e.g., 730 of FIG. 7) may transmit a signal informing that the light of the display is outputting to a biometric sensor module (e.g., 755 of FIG. 7).

In operation 1313, the biometric sensor module (e.g., 755 of FIG. 7) may acquire biometric information (e.g., fingerprint image) when the signal informing the light of the display is outputting is received from the display driving circuit (e.g., 730 of FIG. 7) while preparing to acquire biometric information.

In operation 1315, the biometric sensor module (e.g., 755 of FIG. 7) may identify that communication with the second processor (e.g., 723 of FIG. 7), not in a sleep state, is in a connected state and transmit the acquired biometric information (e.g., fingerprint image) to the second processor.

In operation 1317, the second processor (e.g., 723 of FIG. 7) may perform image process operations for the biometric information received from the biometric sensor module (e.g., 755 of FIG. 7), and in operation 1319, the second processor may transmit the biometric information to which the image processing operation is completed to the first processor (e.g., 721 of FIG. 7).

In operation 1321, the first processor (e.g., 721 of FIG. 7) may perform operations (e.g., unlocking electronic devices, perform payment, enter password, etc.) related to authentication of the electronic device after authenticating the biometric information based on the biometric information (e.g., fingerprint image) received from the second processor (e.g., 723 of FIG. 7).

FIGS. 14 to 16B are views illustrating a biometric information recognition method in an electronic device according to various embodiments.

Figure 14:
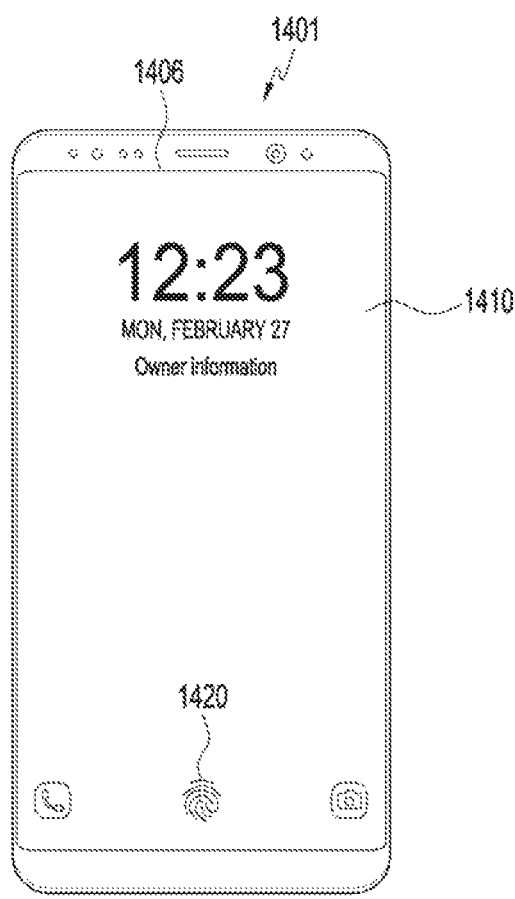

Referring to FIG. 14, an electronic device 1401 (e.g., electronic device 101 or processor 120 or 720) (hereinafter, electronic device 1401 is exemplified) may display a user interface 1010 for inputting a user's fingerprint on a display 1406 (e.g., display device 160 or display 210 or 710).

The user interface 1410 may include a first graphic element 1420 for displaying a fingerprint input position.

The electronic device 1401 may acquire a fingerprint image in a state in which a user's finger is disposed on the first graphic element 1420, and generate user authentication information including fingerprint image and/or pressure information.

In an embodiment, the electronic device 1401 may display the user interface 1410 in response to a user input.

In an embodiment, the user input may include at least one of a predetermined touch/hovering gesture (e.g., at least one of swipe gesture, drag gesture, or scroll) on the display 1406, selection of graphic elements, voice commands, or motion inputs displayed through the display 1406.

Figure 15:
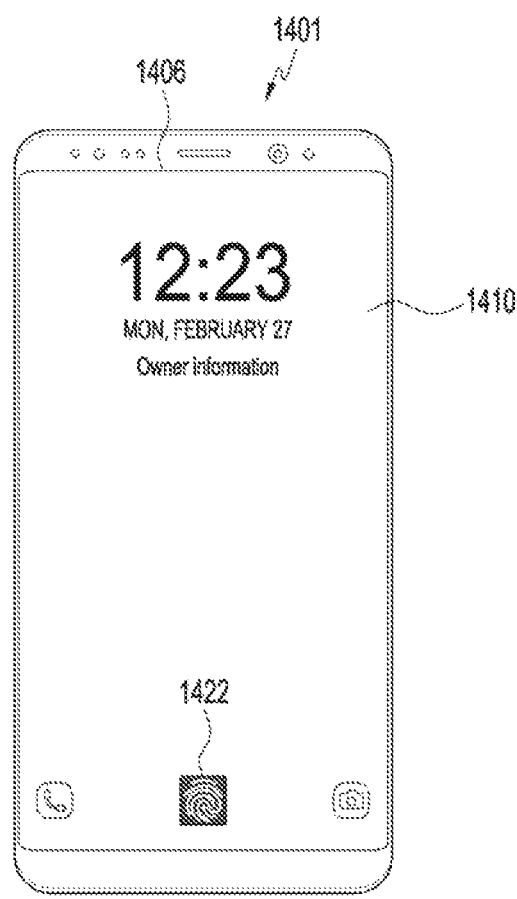

Referring to FIG. 15, the electronic device 1401 may display a second graphic element 1422 in place of the first graphic element 1420 in order to prevent deterioration of the display 1406 due to the first graphic element 1420 being fixedly displayed at a position corresponding to a biometric sensor module (e.g., biometric sensor module 755).

In an embodiment, the electronic device 1401 may periodically switch and display the first graphic element 1420 and the second graphic element 1422.

In an embodiment, the second graphic element 1422 may correspond to an inverted image of the first graphic element 1420, or the second graphic element 1422 may include at least a portion of the inverted image of the first graphic element 1420.

Figures 16A, 16B, 16C:
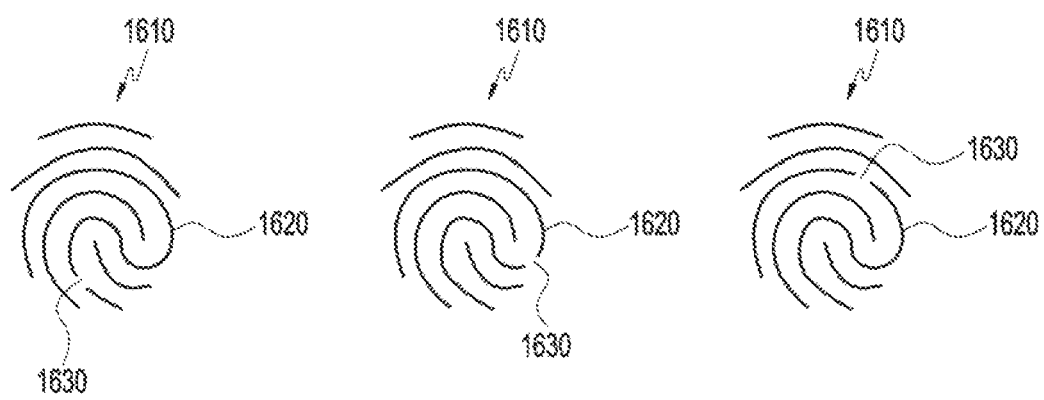

Referring to FIG. 16A, a graphic element 1610 for displaying a fingerprint input position may have a shape of a fingerprint, and the graphic element 1610 may include at least one line 1620. Referring to FIGS. 16A to 16C, in order to prevent the deterioration of the display 1406, the electronic device 1401 may periodically or continuously change the position of a cutoff portion 1630 on the at least one line 1620. The electronic device 1401 may control the display 1406 such that the cutoff portion 1630 moves along the line 1620.

Figure 17:
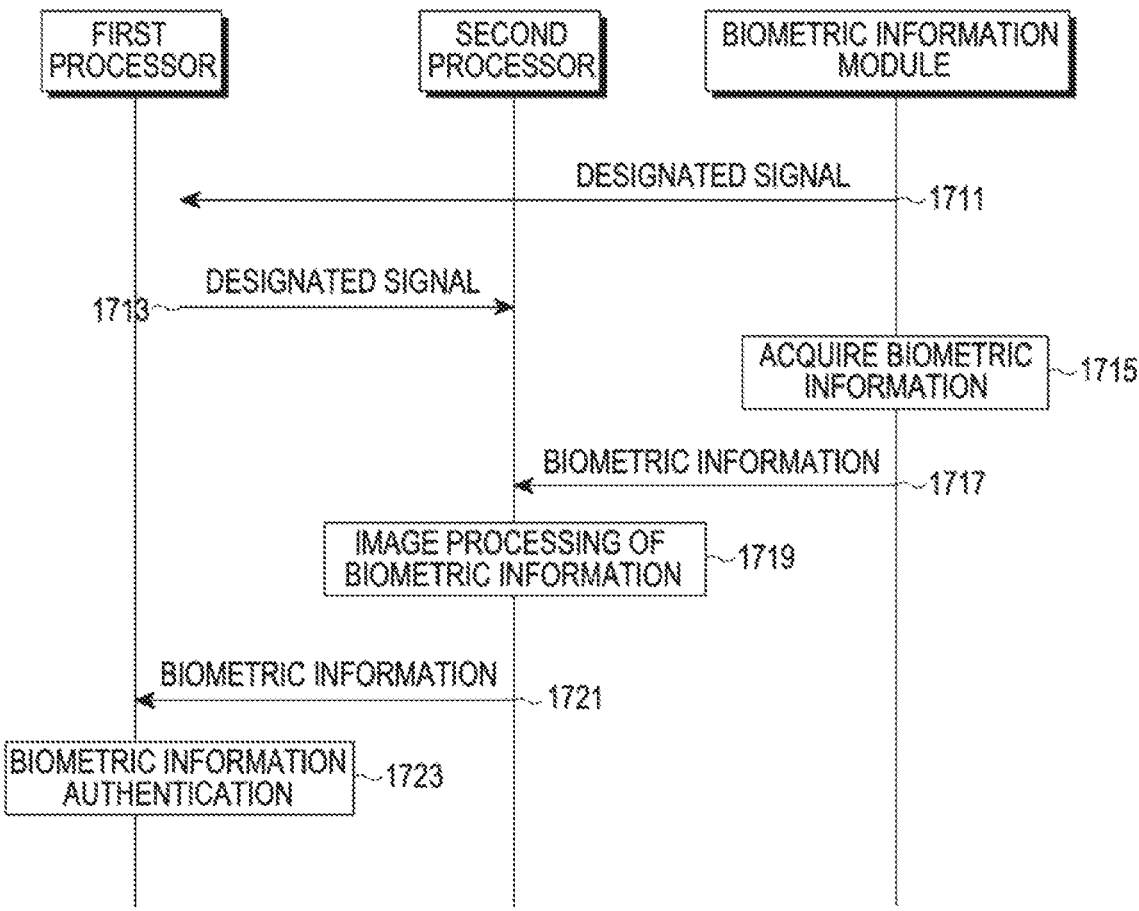
FIG. 17 is a flow chart illustrating a biometric information recognition method in an electronic device according to various embodiments.

FIG. 17 is a flow chart illustrating a biometric information recognition method in an electronic device according to various embodiments. The biometric information recognition method may include operations 1711 to 1723. The biometric information recognition method may be performed by at least one of an electronic device (e.g., electronic device 101, 201, or 701), at least one processor (e.g., processor 120, 220, or 720) of an electronic device, or a control unit of an electronic device. In an embodiment, at least one of the operations 1711 to 1723 may be omitted, some operations may be performed in parallel at the same time, some operations may be reversed, or another operation may be added. FIG. 17 illustrates a state in which the screen of a display (e.g., display device 160 or display 210 or 710) is turned off, as an example.

In operation 1711, a biometric sensor module (e.g., biometric sensor module 255 or 755) may detect an external object (e.g., user's finger) and transmit a first designated signal to a first processor (e.g., first processor 721) based on (or in response to) detection of the external object.

In an embodiment, the first designated signal may be a wake up signal/message/data or an interrupt signal/message/data.

In an embodiment, the first processor in a sleep state (or inactivated state) may wake up (or transition to a normal/activated state) or be activated, based at least in part (or in response to) of the first designated signal.

In an embodiment, in an inactivated state, the first processor may be in a state where it is unable to perform at least one of its functions that could be performed in the normal mode or in the activated state.

In an embodiment, in an activated state, some configuration circuitry of the first processor may be in a power-on state. In an inactivated state, some configuration circuitry of the first processor may be in a power-off state.

In operation 1713, the first processor may transmit a second designated signal to a second processor (e.g., second processor 723), based at least in part (or in response to) of the first designated signal.

In an embodiment, the second designated signal may be a wake up signal/message/data.

In an embodiment, the second processor in a sleep state (or deactivated state) may wake up (or transition to a normal/activated state) or be activated, based at least in part (or in response to) of the second designated signal.

In operation 1715, a biometric sensor module may acquire biometric information (e.g., fingerprint image).

In an embodiment, the biometric sensor module in a sleep state (or inactivated state) may wake up (or transition to a normal) or be activated, based at least in part on (or in response to) the detection of the external object.

In an embodiment, the biometric sensor module may prepare to acquire biometric information after waking up.

When the preparation is completed, the biometric sensor module may automatically acquire biometric information (e.g., fingerprint image).

In operation 1717, the biometric sensor module may transmit the biometric information to the second processor.

In an embodiment, when the biometric information is acquired, the biometric sensor module may transmit a signal/message/data informing the acquisition or transmission of biometric information to the second processor, before transmitting the biometric information.

In an embodiment, the second processor may wake up, and then, perform communication preparation to communicate with the biometric sensor module. When the preparation is completed, the second processor may transmit a signal informing that the communication preparation is completed to the biometric sensor module. The biometric sensor module may transmit biometric information to the second processor in response to the reception of the communication ready signal.

In operation 1719, the second processor may perform an image processing operation for the biometric information (e.g., fingerprint image) received from the biometric sensor module.

In an embodiment, the second processor may change the image characteristics (e.g., resolution, brightness, or size of the image), based at least in part on the designated image processing set, the characteristics of the fingerprint image, or the characteristics of the display.

In operation 1721, the second processor may transmit the image-processed biometric information to the first processor.

In operation 1723, the first processor may authenticate the biometric information received from the second processor.

In an embodiment, the first processor may compare the received biometric information with biometric information previously stored in a memory (e.g., memory 130) prior to receiving the biometric information. The first processor may determine whether authentication is successful, based on the comparison result.

In an embodiment, the first processor may determine the degree of coincidence/matching degree/similarity between the received biometric information and the previously stored biometric information.

In an embodiment, the degree of coincidence/matching degree/similarity may be determined based on the ratio of the number of characteristic value/data/pattern/image of the received biometric information to the number coincident with the characteristic value/data/pattern/image of the previously stored biometric information, or the ratio of the matching number to the total number of characteristic value/data/pattern/image of the previously stored biometric information.

In an embodiment, the first processor may determine that the fingerprint authentication is successful when the value of coincidence or similarity between the received biometric information and the stored biometric information is greater than or equal to a predetermined threshold value. The first processor may determine that the fingerprint authentication has failed when the value of coincidence or similarity is less than the predetermined threshold value.

In an embodiment, the first processor may execute a first function when the fingerprint authentication succeeds, and block execution of the first function or execute a second function when the fingerprint authentication fails.

In an embodiment, the first function may include at least one of an unlock function, an application execution function, a personal authentication function, a payment settlement authentication, a financial settlement authentication, a multimedia control function, an input interface change function or a mode change function.

In an embodiment, the unlock function may include a function of unlocking a certain function or a graphic element via a fingerprint input. The application execution function may include a function of executing at least one of a game application, an SNS application, a document writing application, or a multimedia application, or a function of connecting to a corresponding contact via a communication application (e.g., a phone application or a message application). The personal authentication function may include a function of transmitting at least one of fingerprint information, other personal/authentication/secret information stored in a memory, information on an authentication result, and information set upon successful authentication to an external electronic device (e.g., the electronic device 102 or 104). The multimedia control function may include a function of displaying control menus (e.g., a volume control menu or a playback menu), a volume control function (e.g., volume up, volume down, or silence), or a playback control function (e.g., rewind, fast forward, pause, or playback). The interface change function may include a function of changing at least one of an input interface, an output interface, or a communication interface. The mode change function may include a function of changing from a first mode (e.g., normal mode, guest mode, or restricted mode) into a second mode (e.g., edit mode, administrator mode, or restriction release mode).

In an embodiment, the second function may be a function of informing the user of the authentication failure. In an embodiment, the first processor may display a designated user interface (e.g., message, window, screen, or indicator) or a guidance screen on a display.

According to various embodiments, when the biometric information recognition is performed while the screen of the display is turned on, operations 1711 and 1713 may be omitted.

Figure 18:
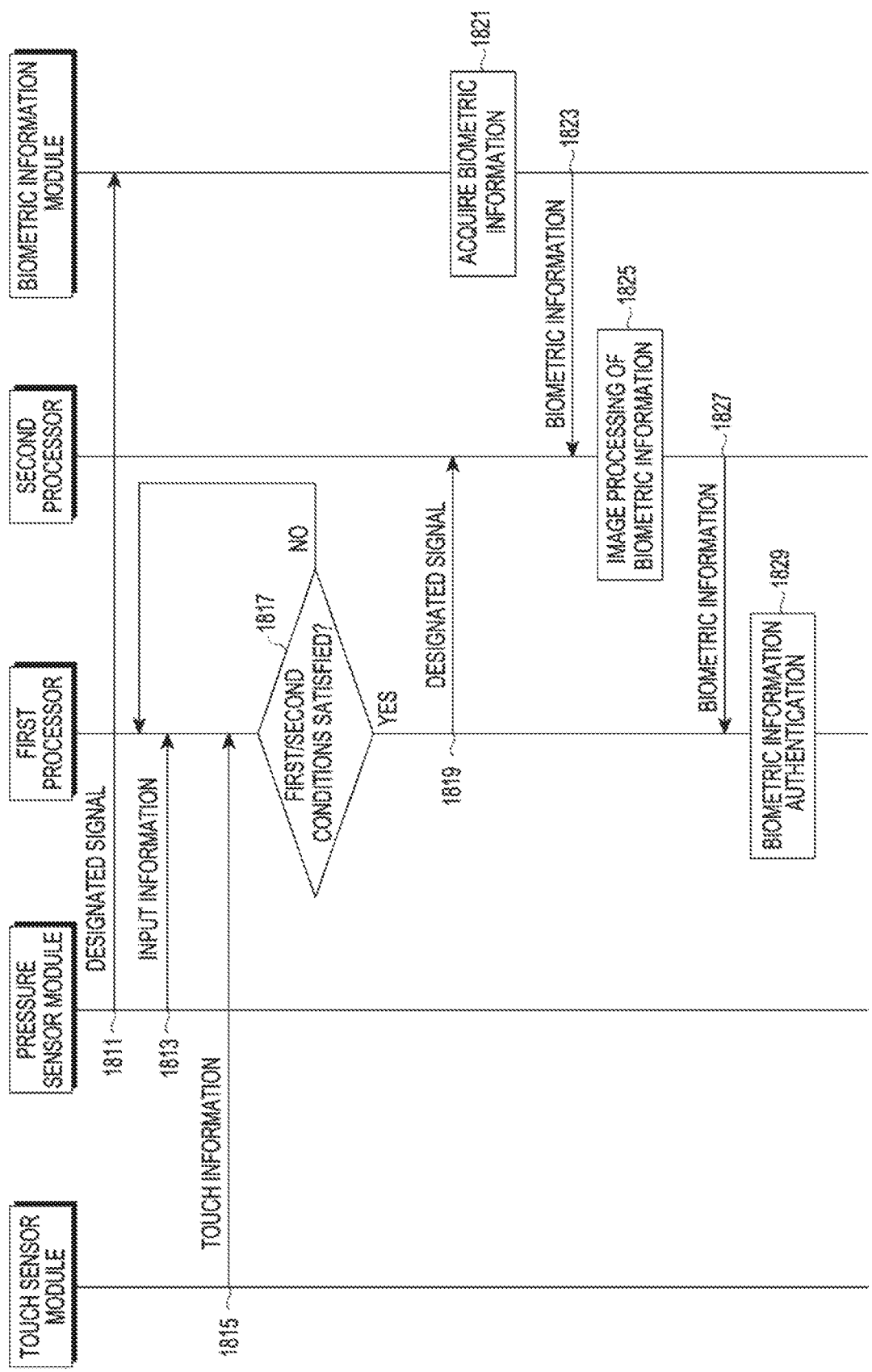
FIG. 18 is a flow chart illustrating a biometric information recognition method in an electronic device according to various embodiments.

FIG. 18 is a flow chart illustrating a biometric information recognition method in an electronic device according to various embodiments. The biometric information recognition method may include operations 1811 to 1829. The biometric information recognition method may be performed by at least one of an electronic device (e.g., electronic device 101, 201, or 701), at least one processor (e.g., processor 120, 220, or 720) of an electronic device, or a control unit of an electronic device. In an embodiment, at least one of the operations 1811 to 1829 may be omitted, some operations may be performed in parallel at the same time, some operations may be reversed, or another operation may be added. FIG. 18 illustrates a state in which the screen of a display (e.g., display device 160 or display 210 or 710) is turned off, as an example.

In operation 1811, a pressure sensor module (e.g., the pressure sensor module 253 or 753) may detect a pressure of an external object (e.g., user's finger) for at least some area (e.g., a touched area of a biometric information recognition area) (or may be referred to as a touch area) of a display, and transmit a first designated signal to a biometric sensor module (e.g., the biometric sensor module 255 or 755), based at least in part on (or in response at least in part to) the pressure detection of the external object.

In an embodiment, the first designated signal may be a wake up signal/message/data, an interrupt signal/message/data, or a signal/message/data for acquiring/processing biometric information.

In an embodiment, a biometric sensor module in a sleep state (or inactivated state) may wake up (or transition to a normal/activated state) or be activated, based at least in part (or in response to) of the first designated signal.

In operation 1813, the pressure sensor module may transmit pressure information representing the pressure intensity/value of the external object for the at least some area (e.g., a touched area of a biometric information recognition area) of the display to a first processor (e.g., the first processor 721).

In operation 1815, a touch sensor module (e.g., the touch sensor module 251 or 751) may transmit touch information of the external object for the at least some area (e.g., a touched area of a biometric information recognition area) of the display to the first processor.

In an embodiment, the first processor in a sleep state (or inactivated state) may wake up (or transition to a normal/activated state) or may be activated, based at least in part of the pressure information and/or touch information.

In operation 1817, the first processor may determine whether a first condition that at least some area (e.g., a touched area of a biometric information recognition area) of the display includes the designated first area and/or a second condition that the pressure intensity/value of the external object is greater than or equal to a designated threshold value is satisfied.

The first processor may perform operation 1819 when the first condition and/or the second condition are/is satisfied, and wait or be inactivated until reception of the next pressure information and/or the next touch information when the first condition and/or the second condition are/is not satisfied.

In operation 1819, when the first condition and/or the second condition are/is satisfied, the first processor may transmit a second designated signal to a second processor (e.g., the second processor 723).

In an embodiment, the second designated signal may be wake up signal/message/data, an interrupt signal/message/data, or a signal/message/data for acquiring/processing biometric information.

In an embodiment, the second processor in a sleep state (or inactivated state) may wake up (or transition to a normal/activated state) or may be activated, based at least in part (or in response at least in part to) of the second designated signal.

Operation 1821 for acquiring biometric information, operation 1823 for transmitting biometric information, operation 1825 for image processing biometric information, operation 1827 for transmitting image-processed biometric information, and operation 1829 for authentication of biometric information are the same as operations 1715 to 1723 illustrated in FIG. 17, so a duplicate explanation will be omitted.

Figure 19:
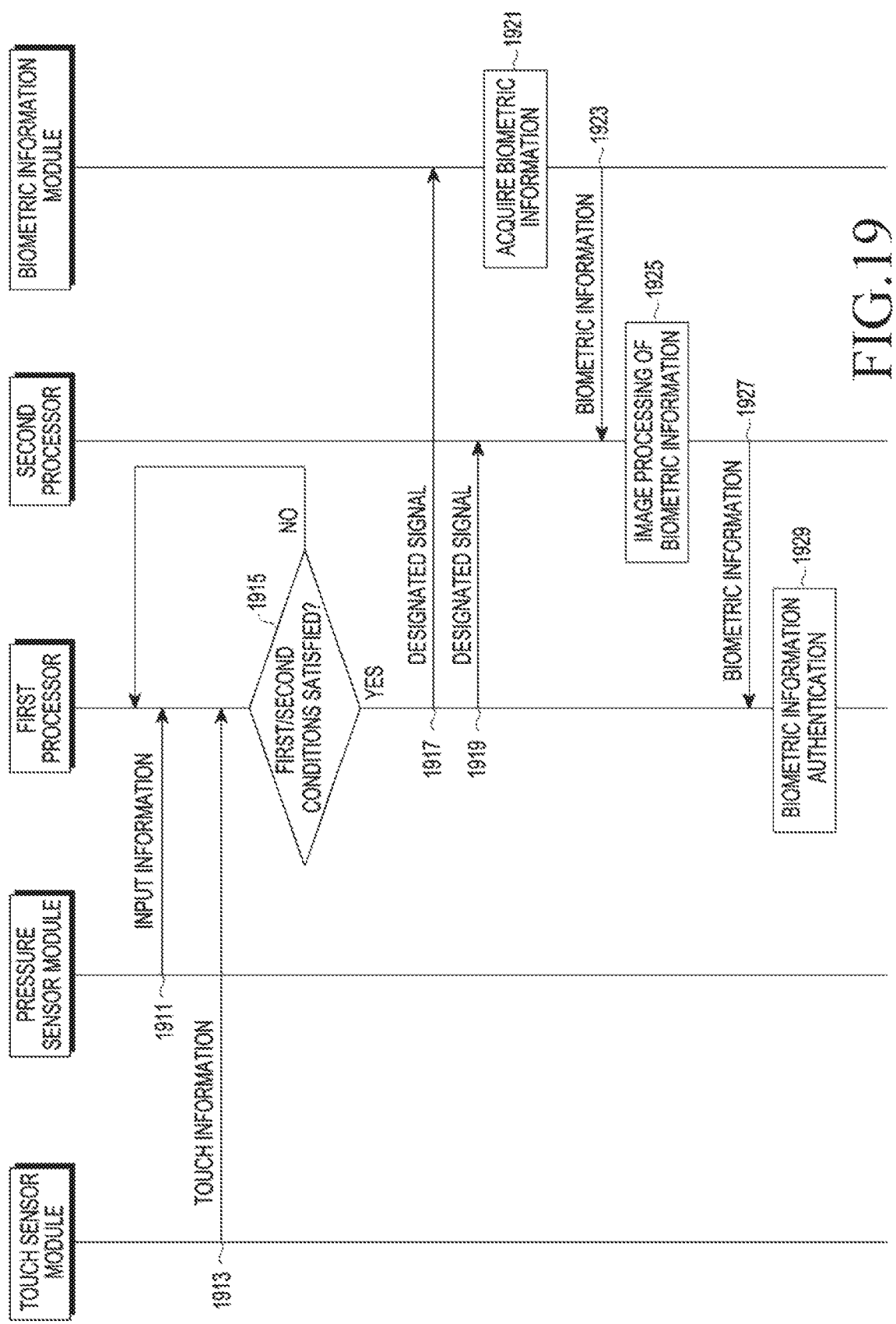
FIG. 19 is a flow chart illustrating a biometric information recognition method in an electronic device according to various embodiments.

FIG. 19 is a flow chart illustrating a biometric information recognition method in an electronic device according to various embodiments. The biometric information recognition method may include operations 1911 to 1929. The biometric information recognition method may be performed by at least one of an electronic device (e.g., electronic device 101, 201, or 701), at least one processor (e.g., processor 120, 220, or 720) of an electronic device, or a control unit of an electronic device. In an embodiment, at least one of the operations 1911 to 1929 may be omitted, some operations may be performed in parallel at the same time, some operations may be reversed, or another operation may be added. FIG. 19 illustrates a state in which the screen of a display (e.g., display device 160 or display 210 or 710) is turned off, as an example.

In operation 1911, a pressure sensor module (e.g., the pressure sensor module 253 or 753) may detect a pressure of an external object (e.g., user's finger) for at least some area (e.g., a touched area of a biometric information recognition area) (or may be referred to as a touch area) of a display, and transmit pressure information representing the pressure intensity/value of the external object to a first processor (e.g., first processor 721).

In operation 1913, a touch sensor module (e.g., the touch sensor module 251 or 751) may transmit touch information of the external object for at least some areas (e.g., touched area of a biometric information recognition area) of the display to a first processor.

In an embodiment, the first processor in a sleep state (or inactivated state) may wake up (or transition to a normal/activated state) or may be activated, based at least in part (or in response at least in part to) of the pressure information and/or touch information.

In operation 1915, the first processor may determine whether a first condition that at least some area (e.g., a touched area of a biometric information recognition area) of the display includes a designated first area and/or a second condition that the pressure intensity/value of the external object is greater than or equal to a designated threshold value is satisfied.

The first processor may perform operation 1917 when the first condition and/or the second condition are/is satisfied, and wait or be inactivated until reception of the next pressure information and/or the next touch information when the first condition and/or the second condition are/is not satisfied.

In operation 1917, when the first condition and/or the second condition are/is satisfied, the first processor may transmit a first designated signal to a biometric sensor module (e.g., the biometric sensor module 255 or 755).

In operation 1919, when the first condition and/or the second condition are/is satisfied, the first processor may transmit a second designated signal to a second processor (e.g., the second processor 723).

In an embodiment, the first designated signal may be a wake up signal/message/data, an interrupt signal/message/data, or a signal/message/data for acquiring/processing biometric information.

In an embodiment, the second processor or the biometric sensor module in a sleep state (or inactivated state) may wake up (or transition to a normal/activated state) or be activated, based at least in part (or in response to) of the first or second designated signal.

Operation 1921 for acquiring biometric information, operation 1823 for transmitting biometric information, operation 1925 for image processing biometric information, operation 1927 for transmitting image-processed biometric information, and operation 1929 for authentication of biometric information are the same as operations 1715 to 1723 illustrated in FIG. 17, so that duplicate explanation will be omitted.

Figure 20:
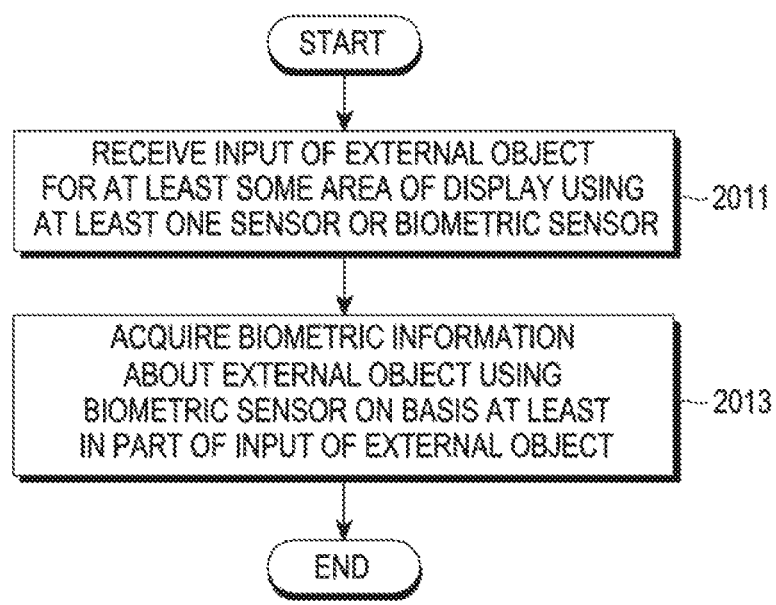
FIG. 20 is a flow chart illustrating a biometric information recognition method in an electronic device according to various embodiments.

FIG. 20 is a flow chart illustrating a biometric information recognition method in an electronic device according to various embodiments. The biometric information recognition method may include operations 2011 to 2013. The biometric information recognition method may be performed by at least one of an electronic device (e.g., electronic device 101, 201, or 701), at least one processor (e.g., processor 120, 220, or 720) of an electronic device, or a control unit of an electronic device. In an embodiment, at least one of the operations 2011 to 2013 may be omitted, some operations may be performed in parallel at the same time, some operations may be reversed, or another operation may be added.

In operation 2011, an electronic device (or at least one processor) may receive an input by an external object for at least some area using at least one sensor (e.g., touch sensor module (e.g., touch sensor module 251 or 751) and/or pressure sensor module (e.g., pressure sensor module 253 or 753) disposed adjacent to at least a display (e.g., display device 160 or display 210 or 710) or a biometric sensor module (e.g., biometric sensor 255 or 755) disposed in at least some area of the display.

In an embodiment, when the input by the external object satisfies a designated condition, the electronic device may transmit a signal for acquiring biometric information of the external object to the biometric sensor. The biometric sensor may transmit a signal for activating pixels corresponding to at least some area among the pixels of the display to a display driving circuit for driving the display, based at least in part of the signal.

In an embodiment, the biometric sensor may transmit a signal for activating at least one processor to at least one processor, based at least in part of the input of the external object.

In an embodiment, at least one sensor may transmit a signal for activating the biometric sensor to the biometric sensor, based at least in part of the input of the external object.

In an embodiment, at least one processor may be activated when the input by the external object satisfies the designated condition.

In an embodiment, at least one processor may include a first processor (e.g., the first processor 721) for authenticating biometric information and a second processor (e.g., the second processor 723) for image-processing biometric information. The first processor may transmit a signal for activating the second processor to the second processor when the input by the external object satisfies the designated condition.

In operation 2013, the electronic device (or at least one processor) may acquire biometric information of the external object using the biometric sensor, based at least in part of the input of the external object.

In an embodiment, when the input by the external object satisfies the designated condition, the electronic device may acquire the biometric information of the external object using the biometric sensor.

In an embodiment, when the input by the external object satisfies the designated condition, the electronic device may transmit a signal for acquiring the biometric information of the external object to the biometric sensor.

In an embodiment, when the input by the external object satisfies the designated condition, the electronic device may transmit a signal for activating pixels corresponding to the at least some area among the pixels of the display to a display driving circuit (e.g., the display driving circuit 730) for driving the display.

In an embodiment, the biometric sensor may acquire the biometric information of the external object, based at least in part of a signal related to the operation state of the display.

In an embodiment, the designated condition may include at least one of a condition in which a value representing a pressure of the external object with respect to at least some area is equal to or greater than a designated threshold value, or a condition that at least some area includes a designated area.

According to various embodiments, a fingerprint recognition method of an electronic device may include receiving an input of an external object for at least some area of the display using a pressure sensor disposed adjacent to a display, identifying the intensity of pressure corresponding to the input of the external object, transmitting an instruction for turning on some pixels corresponding to the at least some area among a plurality of pixels included in the display to a display driving circuit when the intensity of pressure satisfies a designated condition, and transmitting another instruction related to acquisition of biometric information to a biometric sensor such that the biometric sensor disposed in at least some area of the display acquires the biometric information about the external object in response to a signal corresponding to the instruction transmitted from the display driving circuit through a designated interface.

According to various embodiments, fingerprint recognition method of an electronic device may further include receiving an input of an external object for at least some area of the display using a touch sensor disposed adjacent to the display, identifying whether the area corresponding to the external input includes a first area in the at least some area, transmitting an instruction for turning on some pixels corresponding to the at least some area among a plurality of pixels included in the display to a display driving circuit when the area corresponding to the input includes the first area and transmitting another instruction related to acquisition of the biometric information about the external object to the biometric sensor.

According to various embodiments, the fingerprint recognition method of an electronic device may further include transmitting an instruction for turning on some pixels corresponding to at least some area among a plurality of pixels to the display driving circuit and transmitting another instruction related to acquisition of the biometric information about the external object to the biometric sensor, when the intensity of the input corresponding to the input of the external object, received using the pressure sensor, satisfies a designated condition, and the area corresponding to the input of the external object, received using the touch sensor disposed adjacent to the display, includes a first area within the at least some area.

According to various embodiments, a biometric information recognition method of an electronic device may include receiving an input of an external object for at least some areas of the display using a pressure sensor disposed adjacent to a display, identifying the intensity of pressure corresponding to the input of the external object, transmitting an instruction for acquiring biometric information to a biometric sensor disposed in at least some area of the display when the intensity of pressure satisfies a designated condition, and transmitting another instruction related to acquisition of the biometric information to the display driving circuit such that the display driving circuit turns on at least some pixels corresponding to the at least some area among the plurality of pixels in response to a signal corresponding to the instruction transmitted from the biometric sensor though a designated interface.

According to various embodiments, the fingerprint recognition method of an electronic device may further include receiving an input of an external object for at least some area using a touch sensor disposed adjacent to the display, identifying whether the area corresponding to the input of the external object includes a first area in the at least some area, transmitting an instruction for acquiring the biometric information about the external object using the biometric sensor when the area corresponding to the input includes the first area, and transmitting another instruction for turning to some pixels corresponding to the at least some area among the plurality of pixels to the display driving circuit.

According to various embodiments, when the intensity of the input corresponding to the input of the external object received using the pressure sensor satisfies a designated condition and the area corresponding to the input of the external object received using the touch sensor disposed adjacent to the display includes a first area within the at least some area, the biometric information recognition method of an electronic device may further include transmitting an instruction for acquiring the biometric information about the external object using the biometric sensor and transmitting another instruction for turning to some pixels corresponding to the at least some area among the plurality of pixels to the display driving circuit.

According to various embodiments, a biometric information recognition method of an electronic device may include receiving an input of an external object for at least some areas of the display using a pressure sensor disposed adjacent to a display, identifying the intensity of pressure corresponding to the input of the external object, outputting light using at least some pixels corresponding to at least some area among a plurality of pixels included in the display when the intensity of pressure satisfies a designated condition, and acquiring the biometric information about the external object using the light.

According to various embodiments, the fingerprint recognition method of an electronic device may further include receiving an input of an external object for at least some areas using a touch sensor disposed adjacent to the display, identifying whether the area corresponding to the external input includes a first area in at least some area, and outputting light using at least some pixels corresponding to at least some area among a plurality of pixels when the input includes the first area.

According to various embodiments, the fingerprint recognition method an electronic device may further include outputting light using at least some pixels corresponding to at least some area among a plurality of pixels when the intensity of the input corresponding to the input of the external object which is received using the pressure sensor satisfies the designated condition, and the area corresponding to the input of the external object, received using a touch sensor disposed adjacent to the display includes a first area within at least some area.

According to various embodiments, when the intensity of pressure satisfies a designated condition, the fingerprint recognition method of an electronic device may further include transmitting an instruction for outputting light using at least some pixels corresponding to at least some area among a plurality of pixels to the display driving circuit and transmitting another instruction to a biometric sensor disposed in at least some area of the display to acquire the biometric information about the external object using the light.

According to various embodiments, in a non-transitory storage medium storing instructions, the instructions being configured to cause the at least one circuit to perform at least one operation when executed by the at least one circuit, wherein the at least one operation may include receiving an input of an external object for at least some area of the display using a pressure sensor disposed adjacent to the display, identifying the intensity of pressure corresponding to the input of the external object, transmitting an instruction for turning on at least some pixels corresponding to at least some area among a plurality of pixels included in the display to a display driving circuit when the intensity of pressure satisfies a designated condition, and transmitting another instruction related to acquisition of biometric information to a biometric sensor such that the biometric sensor disposed in at least some area of the display acquires biometric information about the external object in response to a signal corresponding to the instruction transmitted from the display driving circuit through a designated interface.

According to various embodiments, in a non-transitory storage medium storing instructions, the instructions being configured to cause the at least one circuit to perform at least one operation when executed by the at least one circuit, wherein the at least one operation may include receiving an input of an external object for at least some area of the display using a pressure sensor disposed adjacent to the display, identifying the intensity of pressure corresponding to the input of the external object, transmitting an instruction for acquiring biometric information about the external object using a biometric sensor to the biometric sensor disposed in at least some area of the display when the intensity of pressure satisfies a designated condition, and transmitting another instruction related to acquisition of biometric information to the display driving circuit such that the display driving circuit turns on at least some pixels corresponding to the at least some area among the plurality of pixels in response to a signal corresponding to the instruction transmitted from the biometric sensor through a designated interface.

According to various embodiments, in a non-transitory storage medium storing instructions, the instructions being configured to cause the at least one circuit to perform at least one operation when executed by the at least one circuit, wherein the at least one operation may include receiving an input of an external object for at least some area of the display using a pressure sensor disposed adjacent to the display, identifying the intensity of pressure corresponding to the input of the external object, transmitting an instruction for outputting light using at least some pixels corresponding to the at least some area among a plurality of pixels included in the display when the intensity of pressure satisfies a designated condition, and acquiring biometric information about the external object using the light.

According to various embodiments, in a non-transitory storage medium storing instructions, the instructions being configured to cause the at least one circuit to perform at least one operation when executed by the at least one circuit, wherein the at least one operation may include receiving an input of an external object for at least some area of the display using at least one sensor disposed adjacent to a display or a biometric sensor disposed in at least some area of the display, and acquiring biometric information of the external object using the biometric sensor, based at least in part on the input by the external object.

What is claimed is:

1. An electronic device comprising:
   a display;
   at least one sensor disposed adjacent to the display;
   a biometric sensor disposed in at least some area of the display; and
   at least one processor,
   wherein the at least one processor is configured to:
      receive an input by an external object about the at least some area using the at least one sensor or the biometric sensor; and
      acquire biometric information of the external object using the biometric sensor when the input by the external object satisfies a designated condition, wherein the at least one processor is configured to determine that the designated condition is satisfied when a value representing a pressure of the external object for the at least some area is greater than a first threshold value and less than a second threshold value which is different from the first threshold value, and wherein the at least one processor is configured to:
control the display to display a first image having a shape of a fingerprint at a position corresponding to the biometric sensor;
control the display to display a second image in place of the first image, the second image being an inverted image of the first image; and
control the display to periodically switch and display the first image and the second image.

2. The electronic device of claim 1,
wherein the at least one processor is configured to transmit a signal for acquiring the biometric information of the external object to the biometric sensor, when the input by the external object satisfies the designated condition.

3. The electronic device of claim 2,
further comprising a display driving circuit configured to drive the display,
wherein the biometric sensor is configured to transmit a signal for activating pixels corresponding to the at least some area among pixels of the display to the display driving circuit, based at least in part of the signal for acquiring the biometric information of the external object.

4. The electronic device of claim 1,
further comprising a display driving circuit configured to drive the display,
wherein the at least one processor is configured to transmit a signal for activating pixels corresponding to the at least some area among pixels of the display to the display driving circuit, when the input by the external object satisfies the designated condition.

5. The electronic device of claim 1,
wherein the biometric sensor is configured to acquire the biometric information of the external object, based at least in part on reception of a signal associated with an operation state of the display.

6. The electronic device of claim 1,
wherein the biometric sensor is configured to transmit a signal for activating the at least one processor to the at least one processor, based at least in part on the input by the external object.

7. The electronic device of claim 1,
wherein the at least one sensor is configured to transmit a signal for activating the biometric sensor to the biometric sensor, based at least in part on the input of the external object.

8. The electronic device of claim 1,
wherein the at least one processor includes a first processor for authenticating the biometric information and a second processor for image-processing the biometric information, and wherein the first processor is configured to transmit a signal for activating the second processor to the second processor when the input by the external object satisfies a designated condition.

9. A non-transitory storage medium storing instructions, the instructions being configured to cause at least one processor to perform at least one operation when executed by the at least one processor, the at least one operation comprises:
receiving an input by an external object for at least some area of a display using at least one sensor disposed adjacent to the display or a biometric sensor disposed in the at least some area of the display; and
acquiring biometric information of the external object using the biometric sensor when the input by the external object satisfies a designated condition,
wherein the at least one processor determines that the designated condition is satisfied when a value representing a pressure of the external object for the at least some area is greater than a first threshold value and less than a second threshold value which is different from the first threshold value, and
wherein the at least one operation further comprises:
controlling the display to display a first image having a shape of a fingerprint at a position corresponding to the biometric sensor;
controlling the display to display a second image in place of the first image, the second image being an inverted image of the first image; and
controlling the display to periodically switch and display the first image and the second image.

10. The non-transitory storage medium of claim 9,
wherein the acquiring of the biometric information of the external object using the biometric sensor comprises transmitting a signal for activating pixels corresponding to the at least some area among pixels of the display to a display driving circuit for driving the display, when the input by the external object satisfies a designated condition.

11. The non-transitory storage medium of claim 9,
wherein the biometric sensor acquires the biometric information of the external object, based at least in part of reception of a signal associated with an operation state of the display.

12. The non-transitory storage medium of claim 9,
wherein the acquiring biometric information of the external object using the biometric sensor comprises transmitting a signal for acquiring the biometric information of the external object to the biometric sensor, when the input by the external object satisfies the designated condition, and
wherein the biometric sensor transmits a signal for activating pixels corresponding to the at least some area among pixels of the display to a display driving circuit for driving the display, based at least in part of the signal for acquiring the biometric information of the external object.

* * * * *